(12) United States Patent
Stehr et al.

(10) Patent No.: US 12,534,756 B2
(45) Date of Patent: Jan. 27, 2026

(54) METHOD AND SYSTEM FOR THE AMPLIFICATION OF A NUCLEIC ACID

(71) Applicant: HP Health Solutions Germany GmbH, Gräfelfing (DE)

(72) Inventors: Joachim Stehr, Martinsried (DE); Ilse Stemplinger, Martinsried (DE); Cordula Urban, Martinsried (DE); Katja Zigann, Martinsried (DE); Aleksander Vaneski, Martinsried (DE); Federico Buersgens, Martinsried (DE); Lars Ullerich, Martinsried (DE)

(73) Assignee: HP Health Solutions Germany GmbH, Gräfelfing (DE)

( * ) Notice: Subject to any disclaimer, the term of this patent is extended or adjusted under 35 U.S.C. 154(b) by 1452 days.

(21) Appl. No.: 16/470,079

(22) PCT Filed: Dec. 6, 2017

(86) PCT No.: PCT/EP2017/081754
§ 371 (c)(1),
(2) Date: Jun. 14, 2019

(87) PCT Pub. No.: WO2018/108680
PCT Pub. Date: Jun. 21, 2018

(65) Prior Publication Data
US 2023/0125683 A1    Apr. 27, 2023

(30) Foreign Application Priority Data

Dec. 16, 2016   (DE) .................. 10 2016 124 692.1

(51) Int. Cl.
| | | |
|---|---|---|
| *C12Q 1/68* | (2018.01) | |
| *B01L 7/00* | (2006.01) | |
| *C12Q 1/6844* | (2018.01) | |
| *B82Y 5/00* | (2011.01) | |

(52) U.S. Cl.
CPC ............. *C12Q 1/6844* (2013.01); *B01L 7/52* (2013.01); *B01L 2200/0647* (2013.01); *B01L 2300/0896* (2013.01); *B01L 2300/1861* (2013.01); *B82Y 5/00* (2013.01)

(58) Field of Classification Search
None
See application file for complete search history.

(56) References Cited

U.S. PATENT DOCUMENTS

| | | |
|---|---|---|
| 6,953,659 B2 | 10/2005 | Jacobson et al. |
| 2003/0022169 A1 | 1/2003 | Mirkin et al. |
| 2004/0038229 A1 | 2/2004 | Keating et al. |
| 2010/0330570 A1* | 12/2010 | Vander Horn ....... C12Q 1/6872 435/6.11 |
| 2011/0028334 A1 | 2/2011 | Hayden |
| 2011/0274706 A1 | 11/2011 | Nelson et al. |
| 2014/0080717 A1* | 3/2014 | Li ......................... C12Q 1/6853 506/26 |
| 2014/0127695 A1 | 5/2014 | Drake |
| 2014/0170664 A1 | 6/2014 | Roche et al. |
| 2014/0377764 A1* | 12/2014 | Stehr ...................... B82Y 20/00 435/6.12 |
| 2016/0265044 A1 | 9/2016 | Nikiforov et al. |

FOREIGN PATENT DOCUMENTS

| | | |
|---|---|---|
| DE | 102012201475 A1 | 8/2013 |
| EP | 1179185 B1 | 8/2009 |
| EP | 2110175 A1 | 10/2009 |
| WO | WO 9922030 A1 | 5/1999 |
| WO | WO 2004055160 A2 | 7/2004 |
| WO | WO 2007143034 A1 | 12/2007 |
| WO | WO 2013113910 A1 | 8/2013 |
| WO | WO 2016074701 A1 | 5/2016 |

OTHER PUBLICATIONS

PCT/EP2017/081754 International Search Report and Written Opinion mailed Mar. 13, 2018, 8 pages.
Renneberg, D and Leumann, CJ; "Watson-Crick base-pairing properties of Tricyclo-DNA", J. Am. Chem. Soc., vol. 124, 2002, pp. 5993-6002.
Hurst, J. et al., "Maximizing DNA Loading on a Range of Gold Nanoparticle Sizes"; Anal Chem., vol. 78, No. 24, 2006, pp. 8313-8318.
Liu et al., "PCR amplification on magnetic nanoparticles: Application for high-throughput single nucleotide polymorphism genotyping"; Biotechnol. J., vol. 2, 2007, pp. 508-511.

* cited by examiner

*Primary Examiner* — Suryaprabha Chunduru
(74) *Attorney, Agent, or Firm* — Foley & Lardner LLP

(57) ABSTRACT

The invention relates to a system (10) for the amplification of a nucleic acid (22), comprising at least one local heating element (12), which is functionalized with at least one connection nucleic acid (14), and at least one primer nucleic acid (16), which is adapted to bind to the at least one connection nucleic acid (14) and to bind to the nucleic acid (22), and/or at least one primer complementary nucleic acid (30), which is adapted to bind to the at least one connection nucleic acid (14) and to elongate the connection nucleic acid (14) by a primer nucleotide sequence by means of an enzymatic reaction. Furthermore, the invention relates to a primer nucleic acid (16), a primer complementary nucleic acid (30), a local heating element (12) and a method for the amplification of a nucleic acid (22).

14 Claims, 11 Drawing Sheets

Specification includes a Sequence Listing.

a)

b)

c)

d)

e)

METHOD AND SYSTEM FOR THE AMPLIFICATION OF A NUCLEIC ACID

The present invention relates to a method and a system for the amplification of a nucleic acid. The invention furthermore relates to a primer nucleic acid, a primer complementary nucleic acid, as well as a local heating element for a polymerase chain reaction for the amplification of a nucleic acid.

SEQUENCE LISTING

The instant application contains a Sequence Listing which has been filed electronically in ASCII format and is hereby incorporated by reference in its entirety. Said ASCII copy, created on Sep. 4, 2019, is named 35528_sequence_listing_EN_20190904.txt and is 3 kilobytes in size.

STATE OF THE ART

From DE 10 2012 201 475 A1 a method for the amplification of a nucleic acid appears to be known in which nanoparticle-oligonucleotide conjugates are used according to at least some embodiments. The nanoparticles are bonded to primers in such a way that covalent bonds to at least one thiol linker are present between primers and nanoparticles, in order to reduce the risk of the primers detaching, in particular during a denaturation step, and to increase the efficiency of the PCR.

US 2003/0022169 A1 appears to disclose, not a method for the amplification of nucleic acid, but instead a method for detecting nucleic acids. For this, the nucleic acid to be detected is apparently bonded to a type of nanoparticles to which oligonucleotides are attached, with the result that they form nanoparticle-oligonucleotide conjugates. The method appears to be based on the fact that a hybridization of the oligonucleotides attached to the nanoparticles with the nucleic acid to be detected causes a measurable change. In addition, a system for detecting a particular nucleic acid appears to be disclosed, in which oligonucleotides are attached to the nanoparticles. These oligonucleotides can then in turn hybridize with a binding nucleotide which has at least two segments, wherein a first segment is complementary to at least one partial sequence of the oligonucleotides attached to the nanoparticle and a second part is complementary to a partial sequence of the nucleic acid.

US 2004/038229 A1 appears to disclose a method for enzymatic manipulation of metal particle-bound DNA. In particular, it appears to be disclosed to provide nanoparticles with a single-stranded DNA primer directly bound thereto, to bind a single-stranded DNA to be amplified to the primer by means of annealing. After completed amplification, which appears to be effected independently of the nanoparticle, the nanoparticle appears to be used to detect the amplified nucleic acid.

US 2011/0274706 A1 appears to disclose a vehicle for delivering nucleic acids to target cells, wherein the vehicle comprises a plurality of nanoparticles and a plurality of nucleic acids. The nanoparticles and the nucleic acids are agglomerated in such a way that they form a nucleic acid-granulation particle with a size of at least 20 nm. In this connection, it furthermore appears to be disclosed that the nucleic acids can be bound to the nanoparticles via linkers, which can be formed as oligonucleotides, such as for instance specific primers.

From EP 1 179 185 B1 a method of detecting an analyte using semiconductor nanocrystals appears to be known. In connection with a method called "fluorescence in situ hybridization (FISH)" for detecting biological samples, it appears to be disclosed that DNA primers can be bonded to nanocrystals via nanocrystal-bonded nucleotides. Independently of the detection method, a conventional PCR appears to be able to be used to generate nucleic acid fragments for the FISH samples.

From US 2016/0265044 A1 conjugates appear to be disclosed in which a biomolecule is bonded to a label, in particular to polymerases, wherein the conjugate has polymerase activity. Furthermore, it appears to be generally disclosed that the biomolecules and/or labels are bound to a surface, wherein the binding can lead to a reversible or irreversible immobilization of nanoparticles, polymerases, oligonucleotides and primers etc. on a surface. As furthermore appears to be disclosed, suitable linkers can be used to bond biomolecules, labels, such as for instance nanoparticles, and a surface. The linkers can therefore apparently be attached to the surfaces, the nanoparticles and/or the primers via covalent binding, non-covalent binding, ionic binding, hydrophobic interactions or a combination thereof.

From US 2014/0170664 A1 a heating mechanism for DNA applications appears to be known. In particular, it appears to be disclosed according to a preferred embodiment to heat a PCR solution by irradiation of nanoparticles located therein. Gold nanospheres appear preferably to be used here, which are securely and irreversibly bound to primers for the PCR by means of a covalent binding, in particular by means of a thiol linkage.

From US 2014/0127695 A1 a method for determining nucleic acid appears to be known, in which magnetic nanoparticles and detectable nanoparticles are provided. Furthermore, according to an embodiment, a nanoparticle-based system for the amplification of a nucleic acid, for example by means of PCR, appears to be provided. In the process, primers are attached to the nanoparticles. Once the primers attached to the nanoparticles have been extended, they can hybridize to form a complex. Moreover, it appears to be disclosed that, for detection purposes, PCR primers are replaced by primers coated on nanoparticles.

From EP 2 110 175 A1 a method for thermal control of at least one temperature-dependent hybridization or binding reaction or an enzymatic reaction appears to be known in order to carry out an amplification in the presence of magnetic nanoparticles. In particular, it appears to be known from this to bind single-stranded nucleic acids, such as for instance oligonucleotides or PCR products, to a bead surface via linker molecules.

From the publication by Liu et al., Biotechnol. J. 2007, 2, 508-511: "PCR amplification on magnetic nanoparticles: Application for high-throughput single nucleotide polymorphism genotyping" a method appears to be known in which PCR products are amplified directly on magnetic nanoparticles, wherein reverse primers appear to be immobilized on the magnetic nanoparticles by means of a covalent binding.

From U.S. Pat. No. 6,953,659 B2 a method appears to be known in which modulators, which can be formed as metal nanoparticles, are used to transfer heat to a nucleic acid, wherein the nucleic acid is bound directly to one of the modulators. Moreover, the modulators appear to be used for local heating in a PCR. Furthermore, it appears to be disclosed that primers for an amplification reaction are modified in such a way that they have a modulator.

WO2004/055160 A2 discloses a synthesis of fluorescent, single-stranded DNA using "click chemistry", as well as the use of the fluorescent single-stranded DNA as a primer for the production of DNA sequencing fragments. By means of "click chemistry" biomolecules are bound to other components, for example DNA is bound to a chip by means of covalent binding.

WO2016/074701A1 discloses nanoparticles, wherein primer nucleic acids formed in one piece are bound directly to the nanoparticles. The primer nucleic acids formed in one piece have two partial sequences, of which one partial sequence is formed as a primer sequence and the other partial sequence is formed as a spacer sequence, by means of which the primer sequence is spaced apart from the nanoparticle. The two partial sequences of the one-piece primer nucleic acids can optionally be bonded to each other via an abasic modification.

THE OBJECT OF THE INVENTION

The object of the invention is to provide a system that is easier to provide and/or more flexible and a method for the amplification of a nucleic acid that is easier to carry out. Moreover, the object of the invention is to provide components for a system that is easier to provide or more flexible and for a method for the amplification of a nucleic acid that is easier to carry out.

DISCLOSURE OF THE INVENTION

The object is achieved by a method according to the invention, a system according to the invention, a primer nucleic acid according to the invention, a primer complementary nucleic acid according to the invention, as well as a local heating element according to the invention with the features of the corresponding independent claims. Preferred embodiments are revealed by the dependent claims, as well as by the description and the figures.

In a first aspect the invention relates to a system for the amplification of a nucleic acid comprising at least one local heating element, which is functionalized with at least one connection nucleic acid, and at least one primer nucleic acid, which is adapted to bind to the at least one connection nucleic acid and to bind to the nucleic acid. As an alternative or in addition to the primer nucleic acid, the system can comprise at least one primer complementary nucleic acid, which is adapted to bind to the at least one connection nucleic acid and to elongate the connection nucleic acid by a primer nucleotide sequence by means of an enzymatic reaction.

In a further aspect the invention relates to a method for the amplification of a nucleic acid in a reaction solution comprising providing at least one local heating element in the reaction solution, wherein the local heating element is functionalized with at least one connection nucleic acid. Moreover, the method comprises providing and/or producing at least one primer nucleic acid in the reaction solution, wherein the primer nucleic acid is adapted to bind to the at least one connection nucleic acid and to bind to the nucleic acid. Furthermore, the method comprises transferring heat by the local heating element to a surrounding of the local heating element in such a way that a nucleic acid bonded to the at least one local heating element via the at least one primer nucleic acid and the at least one connection nucleic acid is heated to and/or above a denaturation temperature.

In a further aspect the invention relates to a primer nucleic acid for a polymerase chain reaction for the amplification of a nucleic acid comprising a connection segment and a primer segment, wherein the connection segment is adapted to bind to a connection nucleic acid, and wherein the primer segment is adapted to bind at least partially to the nucleic acid and to act as primer in the polymerase chain reaction.

In a further aspect the invention relates to the use of a primer nucleic acid as primer for a polymerase chain reaction for the amplification of a nucleic acid, wherein the primer nucleic acid comprises a connection segment and a primer segment, wherein the connection segment is adapted to bind to a connection nucleic acid, and wherein the primer segment is adapted to bind at least partially to the nucleic acid and to act as primer in the polymerase chain reaction.

In a further aspect the invention relates to a primer complementary nucleic acid for a polymerase chain reaction for the amplification of a nucleic acid comprising a connection segment and a primer complementary segment, wherein the connection segment is adapted to bind to a connection nucleic acid, and wherein the primer complementary segment is adapted to elongate the connection nucleic acid by a primer nucleotide sequence and/or a primer nucleic acid by means of an enzymatic reaction.

In a further aspect the invention relates to the use of a primer complementary nucleic acid as a primer template for a polymerase chain reaction for the amplification of a nucleic acid comprising a connection segment and a primer complementary segment, wherein the connection segment is adapted to bind to a connection nucleic acid, and wherein the primer complementary segment is adapted to elongate the connection nucleic acid by a primer nucleotide sequence and/or a primer nucleic acid by means of an enzymatic reaction.

In a further aspect the invention relates to a local heating element for a polymerase chain reaction for the amplification of a nucleic acid, wherein the local heating element is functionalized with at least one connection nucleic acid and the at least one connection nucleic acid is adapted to bind to a primer nucleic acid and/or to a primer complementary nucleic acid.

In a further aspect the invention relates to the use of a local heating element in a polymerase chain reaction for the amplification of a nucleic acid, wherein the local heating element is functionalized with at least one connection nucleic acid and the at least one connection nucleic acid is adapted to bind to a primer nucleic acid and/or to a primer complementary nucleic acid.

An amplification of a nucleic acid is in particular an amplification of a nucleic acid preferably by means of an enzymatic reaction. In other words, the amplification of a nucleic acid corresponds preferably substantially to the duplication of one or more nucleic acids, in particular specific nucleic acids, i.e. nucleic acids of which the nucleotide sequence is at least partially known and which are preferably specifically selected and/or amplified using the known nucleotide sequence. In other words, the amplification of a nucleic acid preferably relates to a copying of the nucleic acids, i.e. the creation of substantially identical amplicons or copies of the nucleic acid to be amplified.

The amplification of the nucleic acid is preferably effected by means of a polymerase chain reaction, which is also called PCR in the following. A PCR within the meaning of the present invention is a method for the amplification of nucleic acids in which an amplification cycle consisting of the steps denaturation, hybridization and elongation is passed through repeatedly, namely preferably in that order. In each pass through, the number of nucleic acid molecules can be increased (doubled in the typically best case), with the result that an exponential increase in the number of nucleic acid molecules can occur. In the following, a nucleic acid to be amplified is called the "original". The original is a single strand and, together with its complementary strand, which is called the "complement", can form a double strand. The original and also the complement can be part of a larger nucleic acid. In particular, in the case of a PCR, a copy of the original formed in one pass through the amplification cycle can be a template for forming a complement in a subsequent pass through and a formed copy of the complement can be a template for forming an original in a subsequent pass through. A common term for the amplification product is "amplicon".

The denaturation step serves to denature a nucleic acid double strand, i.e. to separate it into its two single strands. Thus, in the denaturation step, for example, the original can be separated from the complement. The type of denaturation preferred according to the invention is a thermal denaturation (also called "melting"). For this, at least a part of the nucleic acid double strand or the whole double strand is exposed to a temperature, called the "denaturation temperature", which brings about or at least promotes a separation of the nucleic acid double strands. On the one hand the preferred denaturation temperature is chosen to be so high that nucleic acid double strands can be separated. On the other hand the preferred denaturation temperature can be chosen to be so low that a DNA polymerase, which could likewise be located in the sample, and is possibly likewise located in the heated region or in the surrounding of a local heating element, is not significantly damaged. As the probability of a polymerase staying in the surrounding of a local heating element is very small, however, it may be unnecessary to take into account the polymerase when choosing the denaturation temperature. A typical value for the denaturation temperature is 95° C.

To simplify the following explanation of the invention, "denaturation step" in the nomenclature of the present invention denotes the step of the method in which the heating device generates heat in order to warm up or heat at least a part of the reaction volume and thereby to bring about a denaturation of double-stranded nucleic acid molecules in the heated part of the reaction volume. The duration of the denaturation step is therefore the sum of the time in which the heating device generates heat in the pass through the PCR cycle relevant to the denaturation step. In the case of a heating resistor as heating device, the duration of the denaturation step is thus preferably the total duration of a transmission of electricity through the heating device in order to warm up the reaction volume and thereby to bring about a denaturation of double-stranded nucleic acid molecules. In the case of optothermally excited nanoparticles as local heating element or as heating device, the duration of the denaturation step is thus the duration for which the optical excitation source affects the nanoparticle in order to warm up the reaction volume at least partially and thereby to bring about a denaturation of double-stranded nucleic acid molecules. If, in one pass through the amplification cycle, the heating device generates the heat in several time intervals separated from each other instead of in one time interval, the duration of the denaturation step is the sum of the durations of these intervals. The thus-defined denaturation step in particular does not include emission of heat because of the heating device's own heat capacity, and also not the falling of the temperature in the part of the reaction volume adjoining the heating device, even if the temperatures present there still lie within the range needed for a denaturation. This means in particular that in the method according to the invention denaturation can still also take place after the thus-defined denaturation step. It also means that the heat emitted in the denaturation step as a rule is less than the heat generated in the denaturation step.

The PCR furthermore preferably utilizes at least two oligonucleotides, which are called "primers", a forward primer and a reverse primer. The forward primer is complementary to the 3' end of the original and the reverse primer is complementary to the 3' end of the complement. In the hybridization step (also called "annealing step") the forward primer and/or the reverse primer hybridizes on a sequence complementary to it in the original or complement or amplicon. The hybridization step normally takes place at a temperature which brings about or at least promotes a hybridization of the forward and reverse primers on their complementary sequences in the original or complement or amplicon. It is preferably chosen such that it enables a hybridization of the primers that is as specific as possible. The hybridization temperature typically lies between 50° C. and 72° C.

In the elongation step the hybridized primers are extended or elongated in a complementary way by a polymerase enzyme. Thus a complement can be synthesized starting from the forward primer and an original can be synthesized starting from the reverse primer. For the purpose of the elongation, the polymerase is exposed to a temperature which enables or at least promotes an elongation. In the case of the use of a polymerase of the bacterium *Thermus aquaticus* (Taq) an elongation temperature of 72° C. is typically used. In some embodiments of the PCR the hybridization and the elongation temperatures are identical, i.e. both steps take place at the same temperature (i.e. there are only two temperature stages during the PCR: a combined hybridization and elongation temperature and a denaturation temperature).

The terms "nucleic acid" and "oligonucleotide" in connection with the present invention comprise not only (deoxy)ribonucleic acids or (deoxy)oligoribonucleotides, although the former are preferred, but also nucleic acids and oligonucleotides which contain one or more nucleotide analogues with modifications on their backbone (for example methylphosphonates, phosphorothioates or peptide nucleic acids (PNAs), in particular on a sugar of the backbone (for example 2'-O-alkyl derivatives, 3'- and/or 5'-aminoriboses, locked nucleic acids [LNAs], hexitol nucleic acids, morpholinos, glycol nucleic acid (GNA), threose nucleic acid (TNA) or tricyclo-DNA, regarding this cf. the article by D. Renneberg and C. J. Leumann, "Watson-Crick base-pairing properties of Tricyclo-DNA", J. Am. Chem. Soc., 2002, vol. 124, pages 5993-6002, the content of which in this respect forms part of the present disclosure by reference) or contain the base analogues, for example 7-deazapurine or universal bases such as nitroindole or modified natural bases such as N4-ethylcytosine. In an embodiment of the invention the nucleic acids or oligonucleotides are conjugates or chimeras with non-nucleoside analogues, for example PNA. In an embodiment of the invention the nucleic acids or oligonucleotides contain at one or more positions non-nucleoside units such as spacers, for example hexaethylene glycol or Cn spacer, where n is between 3 and 6. If the nucleic acids or oligonucleotides contain modifications, these are chosen such that a hybridization with natural DNA/RNA analytes is possible even with the modification. Preferred modifications influence the melting behaviour, preferably the melting temperature, in particular in order to be able to distinguish between hybrids with different degrees of complementarity of their bases (mismatch discrimination). Preferred modifications comprise LNA, 8-aza-7-deazapurine, 5-propinyl-uracil and -cytosine and/or abasic interruptions or modifications in the nucleic acid or in the oligonucleotide. Further modifications within the meaning of the invention are, for example, modifications with biotin, thiol and fluorescence donor and acceptor molecules.

Abasic modifications are preferably selected from a group which comprises: 1',2'-dideoxyribose (dSpacer), triethylene glycol (Spacer 9) and hexaethylene glycol (Spacer 18).

The method according to the invention proceeds in a reaction volume or in a reaction solution. Within the meaning of the present invention this means that the amplification of the nucleic acids takes place at least in a part of a coherent reaction volume. The reaction volume is a liquid solution or at least a part of a reaction solution or suspension which, in addition to the solvent or suspending agent, preferably water, normally also contains the nucleic acid(s) to be amplified (also called "target" or "target nucleic acid(s)" in the following). In addition, as a rule, it contains originals and complements and/or other constituents, for example polymerase(s), dNTPs and salts, which can be suspended or dissolved.

A connection nucleic acid here is in particular a nucleic acid which is functionalized on a local heating element and has a nucleotide sequence which enables a binding or hybridization of another nucleic acid, in particular a primer nucleic acid and/or a primer complementary nucleic acid, to the connection nucleic acid. The connection nucleic acid is preferably present as a single-stranded nucleic acid, in particular as a single-stranded oligonucleotide. The connection nucleic acid preferably does not function as primer for the PCR, i.e. the connection nucleic acid preferably does not have a nucleotide sequence which functions as primer in a PCR. The connection nucleic acid preferably has as universal as possible a nucleotide sequence, which makes it possible for the user to match other nucleic acids, which are provided for binding to the connection nucleic acid, in a simple manner or to design them in a suitable manner. This means that the nucleic acid provided for binding to the connection nucleic acid can be provided at least partially with a nucleotide sequence which is at least partially complementary, for example in an overhang, to the as universal as possible a nucleotide sequence of the connection nucleic acid.

A primer nucleic acid here is a nucleic acid which serves or can serve as primer for the amplification of the nucleic acid. The primer nucleic acid is preferably present as an oligonucleotide. At least a part of the nucleotide sequence of the primer nucleic acid is particularly preferably at least partially complementary to the nucleic acid to be amplified. The primer nucleic acid can be formed, for example, as a forward primer and/or as a reverse primer. The primer nucleic acid can have, in particular, several parts, wherein for example one part is adapted to act as a primer for the PCR, while another part or several other parts have other functions. For example, another part of the primer nucleic acid can be adapted to bind to the connection nucleic acid.

A primer complementary nucleic acid here is a nucleic acid which serves to generate primers. The primer complementary nucleic acid is preferably present as an oligonucleotide. At least a part of the nucleotide sequence of the primer complementary nucleic acid is preferably at least partially complementary to a primer for the amplification of the nucleic acid. In other words, the primer complementary nucleic acid is preferably at least partially adapted in such a way that, for example by an enzymatic reaction, at least a part of the primer complementary nucleic acid can be completed to form a double strand such that the segment formed there can be used in a further step as a primer for the amplification of the nucleic acid. In other words, preferably at least a part of the primer complementary nucleic acid serves as a template for the generation of primers. Furthermore, the primer complementary nucleic acid can preferably have several parts, wherein for example one part is adapted to function as a template for the generation of primers, while another part or several other parts of the primer complementary nucleic acid can have other functions. For example, another part of the primer complementary nucleic acid can be adapted to bind to the connection nucleic acid, with the result that the connection nucleic acid bound to another part of the primer complementary nucleic acid can be elongated preferably when the primer complementary nucleic acid is completed.

To complete the primer complementary nucleic acid or to elongate the connection nucleic acid, for example an enzyme or the identical or same enzyme can act for instance like a polymerase which also serves to elongate primers during the amplification or multiplication of the nucleic acid in the reaction solution, in particular within the framework of a PCR. As an alternative or in addition, at least one further enzyme or at least one further polymerase or type of polymerase can be provided in the reaction solution, which serves to complete the primer complementary nucleic acid, but is different from the polymerase for elongating the primers. In this case, preferably at least two types of polymerase would be present in the reaction solution. According to a preferred embodiment, for example, an enzyme which is used merely to elongate the connection nucleic acid can be at least partially removed from the reaction solution, for instance washed out, after elongation of the connection nucleic acid has been effected and before the amplification or multiplication of the nucleic acid.

A local heating element within the meaning of this invention is a heating element which is adapted in particular to heat merely a spatially limited partial volume of the reaction volume or of the reaction solution around the local heating element by a heat energy provided in or by the local heating element. For this, a volume of the local heating element or of the several local heating elements preferably occupies only a small fraction of the total volume of the reaction volume or of the reaction solution, with the result that the heated volume only makes up a small fraction of the entire reaction volume. In particular, particularly rapid temperature changes are made possible thereby, as in particular a thermal inertia of the system or of the local heating element is kept as small as possible. For another thing, the use of a local heating element or of several local heating elements makes a very rapid cooling of the heated volume possible, if a sufficiently large, cold temperature reservoir is present in the reaction volume, wherein the cold temperature reservoir has a colder temperature than the temperature of the surrounding of a heated local heating element in order to cool the one or more local heating elements and their surrounding again after the heating. The temperature of the cold temperature reservoir preferably corresponds substantially to the combined annealing temperature and/or elongation temperature. This can be achieved in that the local heating elements are heated sufficiently strongly (in order to achieve the desired temperature swing) and for a sufficiently short time (so that the heat remains localized). In this way, by means of very rapid temperature changes which take place in each case in a very limited spatial partial volume of the reaction volume around a local heating element, temperature cycles for the amplification reaction can be achieved with a very short duration and in very short time intervals. A localization of the warming or heating of the reaction solution in a surrounding or surroundings of one or more local heating elements has the result that a denaturation of nucleic acids is also effected in the surrounding or surroundings around the local heating element or the local heating elements. For this reason, it can be particularly advantageous to bind at least one primer to the at least one local heating element, in particular via a connection nucleic acid, in order to enable a denaturation of the primer and of the double-stranded amplicon formed into single-stranded nucleic acids.

In a further aspect of the invention the local heating element is adapted and operated such that the heat/heat quantity generated in the local heating element, which is fed to the reaction volume in the denaturation step, is less than $C_R*5°$ C. (degrees Celsius). Here, $C_R$ is the heat capacity of the reaction volume during the heating by the local heating element. In other words, if other inward and outward flows of heat are disregarded, the local heating element heats the reaction volume (averaged over the volume) by less than 5° C.; i.e. as soon as the heat has dispersed in the reaction volume (i.e. the sample volume is thermalized), the global temperature increase introduced by the local heating element in the denaturation step in the entire sample volume is less than 5° C. In other words, the local heating device or the local heating element must add less heat to the reaction volume in the denaturation step than would be needed to heat the entire reaction volume by 5° C. Through this small global energy input into the reaction volume, very rapid temperature cycles are possible, as only a small heat quantity/energy quantity must be removed from the reaction volume after the denaturation step for the return to the annealing and elongation temperature, or preferably the energy/heat quantities introduced by the local heating element during the denaturation step are so small that no global temperature increase that is significant for the PCR occurs and the heat need not be removed from the reaction volume.

The invention provides the advantage that, in particular in comparison with conventional methods for the amplification of nucleic acids by means of global heating of the reaction solution, a very rapid amplification of the nucleic acid can be achieved, as the duration necessary for a cycle of the amplification reaction and the duration between two successive cycles is very much shorter than in conventional methods which require a global heating of the reaction solution.

In particular, the invention also provides the advantage over the LASER-PCR method known from published document DE 10 2012 201 475 A1 that, in contrast, the local heating elements need not be separately or specifically functionalized for each specific application, i.e. for the amplification of each specific nucleic acid. In other words, for the amplification of each specific nucleic acid there is no need according to the invention specifically to produce nanoparticles functionalized in a manner suitable for this, but rather the invention makes it possible for the effort and/or the costs and/or the production duration to be able to be reduced by providing local heating elements which are functionalized with a universally usable connection nucleic acid and by providing primer nucleic acids and/or primer complementary nucleic acids specifically matched to the nucleic acid to be amplified.

Furthermore, the inventors have identified the advantage that an optionally occurring separation of the binding of primer nucleic acids to the connection nucleic acids or to the local heating elements during a denaturation step need not necessarily be disadvantageous for the amplification of the nucleic acid, but it can be utilized advantageously for some embodiments of the invention. As a result, the inventors have identified that a binding between the primer nucleic acid and the local heating element which is also necessarily preserved in or beyond a denaturation step is not strictly necessary.

One or more connection nucleic acids can preferably be functionalized on the local heating element or on each of the local heating elements in such a way that the functionalization is substantially irreversible. According to the invention, in particular, a specific adaptation of the system or of the method for the amplification of the specific, desired nucleic acid can be effected in that, separately from the one or more local heating elements which are functionalized with universal connection nucleic acids, specific primer nucleic acids and/or primer complementary nucleic acids matched to the nucleic acid to be amplified are provided, without the primer nucleic acid and/or the primer complementary nucleic acid having to be functionalized, in particular irreversibly, on the local heating elements. Thus, for example, local heating elements which are functionalized with universal connection nucleic acids can be used in combination with a plurality of different primer nucleic acids and/or primer complementary nucleic acids, if the connection nucleic acids and the primer nucleic acids and/or the primer complementary nucleic acids can bind to each other.

This furthermore provides the advantage that possibly already existing local heating elements which are functionalized for example with a universal connection nucleic acid can be used for new applications, i.e. for the amplification of another nucleic acid, and only the primer nucleic acid and/or the primer complementary nucleic acid has to be matched to the new application or to the nucleic acid to be amplified.

According to a preferred embodiment, the at least one local heating element is formed as a nanoparticle and is adapted in particular to transfer heat to its surrounding by an excitation.

Nanoparticles are preferably particles which have particular optical properties because of their size, in particular characteristic absorption and/or scattering spectra which thus do not emerge, or do not emerge as clearly, in the volume material. The nanoparticles preferably have a diameter of between 2 and 500 nm, particularly preferably between 3 and 300 nm and quite particularly preferably between 5 and 200 nm. Preferred nanoparticles have a diameter of between 7 and 150 nm. The nanoparticles can be spherical, but non-globular shapes are in particular also taken into consideration, e.g. elongated nanoparticles (nanorods). In a preferred embodiment, the nanoparticle comprises at least one semiconductor or a metal, preferably a noble metal, e.g. gold or silver. In one embodiment the nanoparticle consists entirely of the metal, in another the metal forms only a part of the nanoparticle, e.g. its shell. A preferred nanoparticle can be a core-shell nanoparticle. A preferred nanoparticle can have pores on its surface which can be occupied by atoms or molecules with a size and charge determined by the properties of the pores, particularly preferably these atoms or molecules only attach to the nanoparticle when it is in a solution. According to the invention, the nanoparticle also comprises the atoms and molecules attached to its surface. Preferred nanoparticles are suitable for absorbing optical energy because of their material absorption or plasmon resonance.

If, due to the excitation of a nanoparticle, heat is transferred to its surrounding, this means that energy is transferred to the nanoparticle and from the nanoparticle to at least a part of the reaction solution in the surrounding of the nanoparticle, wherein the nanoparticle heats its surrounding by transferring the energy. Due to the excitation of the nanoparticles the immediately surrounding of the nanoparticles is preferably heated more strongly than the more remote surrounding of the nanoparticles. Normally, the nanoparticles are first heated by excitation and then transfer heat to their surrounding. However, it is also conceivable that due to the excitation of the nanoparticles heat is transferred to their surrounding, without the nanoparticles themselves being heated first.

The surrounding of the nanoparticles is preferably a spherical volume which has 100 times the diameter of the nanoparticle located at its centre, particularly preferably has 10 times the diameter, quite particularly preferably 4 times the diameter and preferably less than 2 times the diameter.

In particular, a local heating of the reaction volume is effected in a surrounding, i.e. a restricted volume region, around the local heating element or around the nanoparticle. According to the invention, a single local heating element or a single nanoparticle or several local heating elements or several nanoparticles can be provided. The excitation of the nanoparticle can be effected in particular by means of an optical excitation, i.e. by means of a supply of optical radiation, which is at least partially absorbed by the nanoparticle. The optical excitation can particularly preferably be effected by means of laser radiation, wherein the radiation spectrum of the laser radiation is preferably chosen such that it at least partially overlaps with an absorption spectrum of the nanoparticle. The use of laser radiation for the optical excitation of the nanoparticle can be advantageous in particular also because an excitation of the nanoparticle for an only very short duration and at a high repetition rate can be achieved in particular by means of pulsed laser radiation, which can be very advantageous for a local heating for the amplification of the nucleic acid. A detailed description of the local heating of at least a part of the reaction volume using nanoparticles and an optical excitation by means of laser radiation can be found in the published document DE 10 2012 201 475 A1 already cited above.

For example, it can be sufficient for the amplification of the nucleic acid to heat the reaction volume locally by means of the local heating elements, although a combination with a global heating of the reaction volume, for example by conventional heating elements, such as for instance heating blocks, is possible. One or more connection nucleic acids can particularly preferably be bound to a surface of the nanoparticle. Different connection nucleic acids can preferably also be bound to the surface of the nanoparticle, for example by means of a thiol linker in each case.

The use of nanoparticles as local heating elements thus provides the advantage that local heating elements with particularly small volume and thus with particularly low thermal inertia can be provided. The nanoparticles are preferably in direct contact with the reaction solution. In this way, particularly rapid temperature changes can thus be achieved and therefore the duration of thermal cycles and/or the intervals between two successive thermal cycles can be minimized.

Furthermore, the use of nanoparticles has the advantage that the nanoparticles can be matched to an excitation light source to be used in a particularly simple manner with respect to their absorption spectrum, in order to optimize the energy transfer. In addition, nanoparticles, in particular nanoparticles of gold and/or other noble metals, often provide the advantage that nucleic acids can be attached to their surface in a simple manner, such as for instance by means of thiol linkers.

The at least one local heating element is preferably formed as a micro heating element and is particularly preferably adapted to transfer heat to its surrounding by a resistive heating. The micro heating element is preferably in direct contact with the reaction solution or the reaction volume. For example, a micro heating element can be present in the form of an electrically conductive wire. Here wires which have a particularly thin diameter, such as for instance in the range of a few micrometres, are particularly preferably used in order to keep the volume and the thermal inertia of the micro heating element as small as possible. The heating of the surrounding of the micro heating elements can preferably be effected by a resistive heating of the micro heating elements, which can be achieved for example by a continuous and/or pulsed energizing of the micro heating elements. The micro heating elements are particularly preferably formed from a noble metal, such as for instance gold and/or silver, and/or coated therewith, in order to enable a simple conjugation or functionalization of a surface of the micro heating element with one or more connection nucleic acids.

The use of a micro heating element as local heating element, in particular the use of a resistive heated wire, provides the advantage that a local heating of the surrounding of the respective micro heating element can be achieved with particularly simple technical means, as essentially only a controlled energizing of the micro heating element needs to be carried out to heat the micro heating element. The energizing is preferably effected by means of an external voltage source and/or current source. According to some preferred embodiments one or more batteries can be sufficient as an external voltage source in order to heat or energize the at least one micro heating element. In particular, the energizing can be effected in such a way that the denaturation temperature is reached and/or exceeded locally in a surrounding of the micro heating element, while at a greater distance from the micro heating element the reaction volume or the reaction solution has a lower temperature, which is preferably maintained at the elongation and/or annealing temperature necessary for the amplification of the nucleic acid. For example, it is possible to provide a plurality of local heating elements, which are in each case formed as a nanoparticle or as a resistive micro heating element or as a microwire. In particular, a plurality of nanoparticles can be provided as local heating elements and/or a plurality of micro heating elements can be provided as local heating elements. For example, the nanoparticles can be heated by means of optical excitation and the micro heating elements can be heated by means of energizing.

Preferably, a local heating element, in particular a micro heating element, can additionally be adapted to heat at least a part of the reaction solution globally, with corresponding excitation and/or energizing, i.e. to heat not only a surrounding around the local heating element. This can be effected for example by a stronger and/or longer resistive heating or energizing of the micro heating element, with the result that, for example, the surrounding around the micro heating element which is heated thereby enlarges until the surroundings of several neighbouring micro heating elements optionally overlap each other. Furthermore, for the global heating, the energizing or the resistive heating of the at least one micro heating element can be effected in such a way that a change in the average temperature of the reaction solution is effected, in particular also outside the surrounding of the at least one micro heating element.

The at least one local heating element is particularly preferably in direct contact with the reaction solution or the reaction volume. In particular, several local heating elements can be provided as colloidal nanoparticles in the reaction solution or in the reaction volume and/or one or more local heating elements can be provided as micro heating elements, in particular as microwires, running at least partially through the reaction solution or through the reaction volume. This provides the advantage that a thermal inertia is kept as small as possible, as at least a part of the reaction solution with the nucleic acid to be amplified is located in the directly surrounding of the local heating elements, which are heated by means of local heating.

The primer nucleic acid has at least one primer segment, which is adapted for binding to the nucleic acid, and has at least one connection segment, which is adapted for binding to the at least one connection nucleic acid. In other words, the primer nucleic acid has at least two segments, comprising a primer segment and a connection segment. The primer nucleic acid can be formed as an oligonucleotide, wherein the primer segment and/or the connection segment preferably in each case form a part of the oligonucleotide. The connection segment is preferably adapted in such a way that it enables a binding of the primer nucleic acid to a connection nucleic acid. In particular, the connection segment can be adapted to hybridize at least partially with the connection nucleic acid. The primer segment is preferably adapted to function as a primer for the amplification of the nucleic acid. In particular, the primer segment can be adapted to act as forward primer and/or as reverse primer.

Independently of the primer nucleic acid, which is adapted to bind to the connection nucleic acid, according to a preferred embodiment at least one further primer, which is not adapted to bind to the connection nucleic acid, can be present in the reaction solution. For example, a forward primer can be formed as a primer nucleic acid and adapted to bind to the connection nucleic acid, while a reverse primer is not adapted to bind to the connection nucleic acid, or vice versa.

Preferably, a nucleotide sequence in the connection segment of the primer nucleic acid is at least partially complementary to a nucleotide sequence of the connection nucleic acid and/or a nucleotide sequence in the primer segment is at least partially complementary to a nucleotide sequence of the nucleic acid. This provides the advantage that the primer nucleic acid with the connection segment can hybridize with the connection nucleic acid and/or that the primer nucleic acid with the primer segment can hybridize with the nucleic acid to be amplified.

Preferably, the primer complementary nucleic acid has at least one connection segment, which is adapted to bind to the at least one connection nucleic acid. Further preferably, the primer complementary nucleic acid has at least one primer complementary segment, which is adapted to elongate the connection nucleic acid by a primer nucleotide sequence by means of an enzymatic reaction. In other words, the primer complementary segment can preferably serve as a template for generating a primer nucleotide sequence, wherein the connection nucleic acid is elongated by a primer nucleotide sequence by means of an enzymatic reaction. In other words, the primer complementary nucleic acid preferably has a connection segment, by means of which the primer complementary nucleic acid can bind to the connection nucleic acid, and furthermore a primer complementary segment, which can serve as a template for generating a primer nucleotide sequence. The primer nucleotide sequence can serve as a primer for an amplification reaction, in particular for a PCR, for the amplification of the nucleic acid and is particularly preferably at least partially complementary to the nucleic acid. Particularly preferably, the primer complementary nucleic acid is adapted in such a way that, if the primer complementary nucleic acid is bound to the connection nucleic acid by means of the connection segment, the connection nucleic acid can be extended or elongated by a primer segment or by a primer nucleotide sequence by means of an enzymatic reaction, such as for instance by means of a polymerase, with the result that the elongated connection nucleic acid can serve at least partially as a primer for the amplification of the nucleic acid. In other words, the primer complementary nucleic acid can preferably serve to individualize the local heating elements functionalized with connection nucleic acids by means of an enzymatic reaction in such a way that they can serve as primers or primer nucleic acids for the amplification of the desired nucleic acid. This has the advantage that local heating elements which are functionalized with a universal connection nucleic acid can be used, which can be individualized, i.e. matched to the specific nucleic acid to be amplified, only in the reaction solution or in the reaction volume and/or before, in particular immediately before, the actual amplification reaction by means of providing one or more suitable primer complementary nucleic acids. Furthermore, this makes it possible to individualize local heating elements which are functionalized with, in particular universal, connection nucleic acids by means of different primer complementary nucleic acids, with the result that they are adapted for example for the, in particular simultaneous, amplification of different nucleic acids.

Preferably, a nucleotide sequence in the connection segment of the primer complementary nucleic acid is at least partially complementary to a nucleotide sequence of the connection nucleic acid and/or a nucleotide sequence in the primer complementary segment is at least partially complementary to the primer nucleotide sequence. This enables a hybridization of the primer complementary nucleic acid on the connection nucleic acid and/or a hybridization of the primer nucleotide sequence formed by enzymatic elongation of the connection nucleic acid on the nucleic acid to be amplified.

According to a preferred embodiment several local heating elements are provided which are functionalized in each case with several connection nucleic acids. Each local heating element can be functionalized with several similar or different connection nucleic acids, wherein the connection nucleic acids differ, for example, in their nucleotide sequence. Furthermore, first local heating elements, which are functionalized with connection nucleic acids of a first type, and second local heating elements, which are functionalized with connection nucleic acids of a second type, can be provided. This can, for example, make it possible to amplify several different nucleic acids substantially simultaneously in one reaction solution or in one reaction volume. In other words, this can serve to achieve a multiplexing during the amplification of nucleic acids.

Preferably, the primer nucleic acid has at least one abasic modification between the at least one connection segment and the at least one primer segment. This provides the advantage that there is a separation or a break between the connection segment and the primer segment. In particular, the at least one abasic modification can have the effect that an enzymatic reaction, such as for example the elongation of the primer segment along the nucleic acid to be amplified by means of a polymerase, preferably does not extend onto the connection segment. In other words, the provision of at least one abasic modification, preferably of several abasic modifications, can interrupt and/or end the progress of an enzymatic reaction, in order to exclude specific regions, in particular of the connection segments, from the enzymatic reaction.

In particular in an embodiment in which the connection nucleic acids functionalized on local heating elements have been elongated corresponding to the primer complementary nucleic acids by a primer segment or a primer nucleotide sequence and the primer complementary nucleic acids bound to the connection nucleic acids have been detached again or removed after a heating of the respective local heating elements, it can be helpful for the connection nucleic acids to have one or more abasic modifications. One or more abasic modifications can hereby be provided between a part of the original connection nucleic acid and the added primer segment, whereby preferably a part of the original connection nucleic acid can be excluded from the enzymatic reaction. Preferably, the connection nucleic acids have the at least one abasic modification at a distance of two nucleotide bases from the 3' end, further preferably at a distance of three nucleotide bases from the 3' end, particularly preferably at a distance of four nucleotide bases from the 3' end and quite particularly preferably at a distance of at least five nucleotide bases from the 3' end. This can be advantageous in order to provide the polymerase for the elongation at the 3' end of the connection nucleic acids with a short part of double-stranded nucleic acid as starting and/or binding point for a polymerase.

According to a further preferred embodiment the connection nucleic acid can have at least one abasic modification, which is arranged preferably at least a few nucleotide bases away from the 3' end of the connection nucleic acid, for example less than 20 nucleotide bases, preferably less than ten nucleotide bases. This has the advantage that the preferably few nucleotide bases between the 3' end of the connection nucleic acid and the abasic modification form a double strand over at least a few nucleotide sequences with a primer complementary nucleic acid bound to the connection nucleic acid and thus provide, for example, a starting and/or binding point for a polymerase. This provides the advantage that in fact the primer complementary segment can be completed, for example, by a polymerase, while an action of the polymerase on the abasic modification is interrupted.

According to a further preferred embodiment a plurality of, in particular different, primer nucleic acids can be provided, the primer segments of which are formed as forward primers and/or as reverse primers. In particular, the local heating elements and/or the connection nucleic acids and/or the primer nucleic acids and/or the primer complementary nucleic acids can be formed in such a way that on some local heating elements exclusively forward primers are formed and/or on other local heating elements only reverse primers are formed. It can thereby be achieved, for example, that a nucleic acid to be amplified is bound at one end to a local heating element with a forward primer and is bound at the other end to a local heating element with a reverse primer. The heating of the nucleic acid, in particular to and/or above the denaturation temperature, can thereby be particularly efficiently effected, preferably by means of the two local heating elements, as heat can act on the nucleic acid from two sides.

Alternatively or additionally, both forward primer and reverse primer can be formed on some local heating elements. This provides the advantage that a nucleic acid to be amplified can be bound to the same local heating element with both ends. This enables a particularly effective heating of the nucleic acid, in particular above the denaturation temperature, as the average distance of the nucleic acid from the local heating element can be reduced or limited.

According to the invention the local heating element is provided to heat its surrounding and in particular to heat a limited partial volume of the reaction volume in its surrounding preferably to a temperature greater than or equal to the denaturation temperature. If the denaturation temperature is reached or exceeded, a nucleic acid elongated in an enzymatic reaction and bonded to the local heating element via the connection nucleic acid and optionally via the primer nucleic acid is preferably detached, with the result that it is no longer bonded to the local heating element via the connection nucleic acid and optionally via the primer nucleic acid. Furthermore, double-stranded nucleic acids are at least partially separated into single strands. If the primer nucleic acid is bound to the connection nucleic acid by means of hybridization, it is not to be ruled out that the primer nucleic acid also detaches from the connection nucleic acid when the denaturation temperature is reached or exceeded. This does not generally stand in the way of the functioning of the system and/or method according to the invention, as after the detachment of the primer nucleic acid from the connection nucleic acid either the same primer nucleic acid can bind to the connection nucleic acid again at lower temperatures than the denaturation temperature or another primer nucleic acid can bind to the liberated connection nucleic acid. If it is desired that the same primer nucleic acid binds again to the connection nucleic acid to which it was previously bound, it can be advantageous to keep a duration of the excitation or heating of the local heating element as short as possible, with the result that, although a denaturation can take place, the temperature in the surrounding of the local heating element falls below the denaturation temperature again as rapidly as possible, in order to minimize the duration which is available to the primer nucleic acid for diffusing away or for removal from the connection nucleic acid. As a duration of a few microseconds is often sufficient for a denaturation, it can thus be advantageous to carry out the heating or excitation of the local heating element also over a duration of only a few microseconds. Preferably, the heating or excitation of the at least one local heating element for a denaturation step is effected for less than 1 ms, further preferably for less than 500 µs, more preferably for less than 250 µs, still more preferably for less than 100 µs, much more preferably for less than 50 µs, very much more preferably for less than 25 µs, most preferably for less than 10 µs.

However, for other preferred embodiments, it can be desirable to avoid or prevent a detachment of the primer nucleic acid from the connection nucleic acid as far as possible. For this, according to preferred embodiments the connection nucleic acid and/or the primer nucleic acid can, preferably in each case, have at least one immobilizing element, which is adapted to immobilize the primer nucleic acid, if bound to the connection nucleic acid, to the connection nucleic acid in such a way that the primer nucleic acid also remains bound to the connection nucleic acid during and/or after a denaturation step. The at least one immobilizing element can be formed, for example, as at least one modification in the nucleotide sequence of the connection nucleic acid and/or in the nucleotide sequence of the primer nucleic acid, in particular in the connection segment of the primer nucleic acid, wherein the at least one modification has, for example, at least one amino group. The at least one modification can preferably then have the result that by means of a chemical reaction, for instance by means of a d-linker, the connection nucleic acid and the primer nucleic acid are bonded to each other sufficiently securely in such a way that they do not detach from each other even at a temperature greater than and/or equal to the denaturation temperature. If such an immobilization of the primer nucleic acid on the connection nucleic acid is desired, it can be advantageous to carry out the immobilization before carrying out the method for amplification of the nucleic acid, in particular before the surrounding of the local heating element is heated to the denaturation temperature for the first time by means of the at least one local heating element. Furthermore, it can be advantageous to remove from the reaction solution any excess primer nucleic acids which are not bound to a connection nucleic acid after the immobilization and preferably before carrying out the method for amplification. For example, the removal of the unbound primer nucleic acids can be effected by means of a centrifugation and/or a filtration.

According to a further embodiment at least one further reaction is also carried out before carrying out an amplification reaction, such as for instance a PCR. The at least one further reaction can comprise, for example, a reverse transcription (RT), in which a type of nucleic acid such as e.g. RNA is transcribed e.g. by an enzymatic reaction into another type of nucleic acid such as e.g. DNA.

Primer complementary nucleic acids and/or primer nucleic acids can be present preferably in each case in a concentration of more than 1 nM, particularly preferably more than 5 nM and quite particularly preferably more than 25 nM, and/or preferably in a concentration of less than 1000 nM, particularly preferably less than 300 nM and quite particularly preferably less than 100 nM.

It is understood that the features mentioned above and those yet to be explained below can be used not only in the combination indicated in each case but also in other combinations or alone, without departing from the scope of the present invention.

The invention is schematically represented with the aid of embodiment examples in the drawings and is described with reference to the drawings in the following.

DETAILED DESCRIPTION OF THE DRAWINGS

Figure 1A:
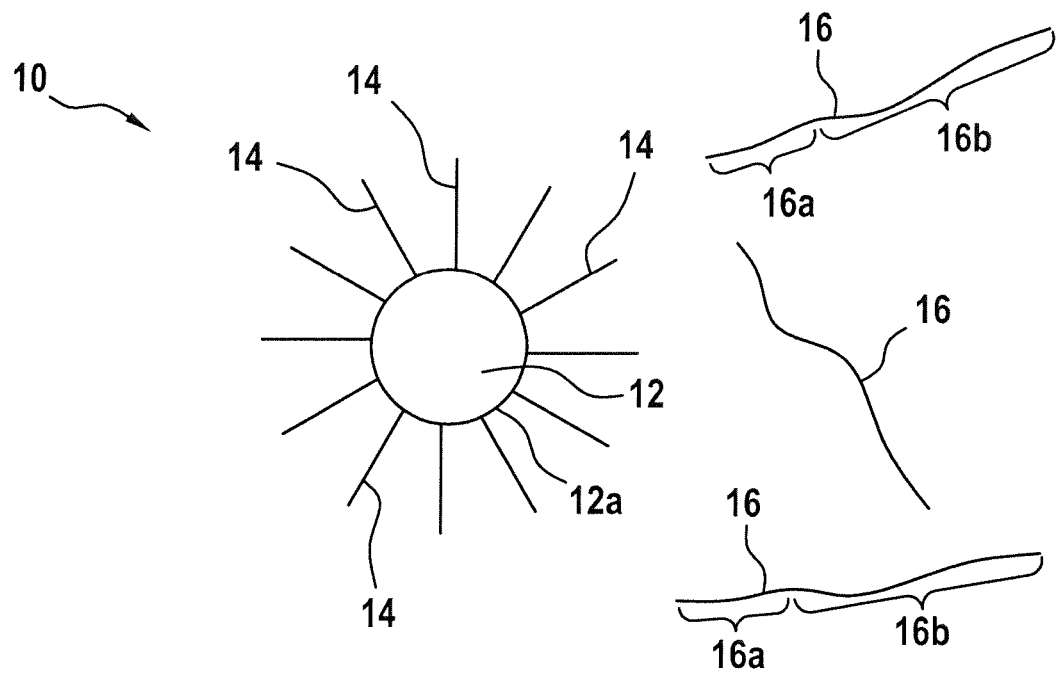
FIGS. 1A to 1E show, in schematic representations, a first preferred embodiment of the invention.

FIGS. 1A to 1E show, in a schematic representation, a first preferred embodiment of a system 10 for the amplification of a nucleic acid, wherein the system has at least one local heating element 12, which is functionalized with several connection nucleic acids 14. Particularly preferably, the connection nucleic acids 14 are attached sufficiently securely to the local heating element 12, with the result that they remain attached to the local heating element 12 even if a temperature of the local heating element 12 and/or a temperature of the surrounding of the local heating element 12 reaches and/or exceeds a denaturation temperature. The connection nucleic acids 14 can be formed similarly and/or differently. Furthermore, the system 10 has a plurality of primer nucleic acids 16, which are provided separately from the local heating element 12 and the connection nucleic acids 14. The primer nucleic acids 16 in each case have a connection segment 16a and a primer segment 16b. In particular, the system 10 is adapted to be provided in a reaction volume, in particular in a reaction solution 20 (see FIG. 1E). Particularly preferably, a plurality of systems 10 are provided in the reaction solution.

Figure 1B:
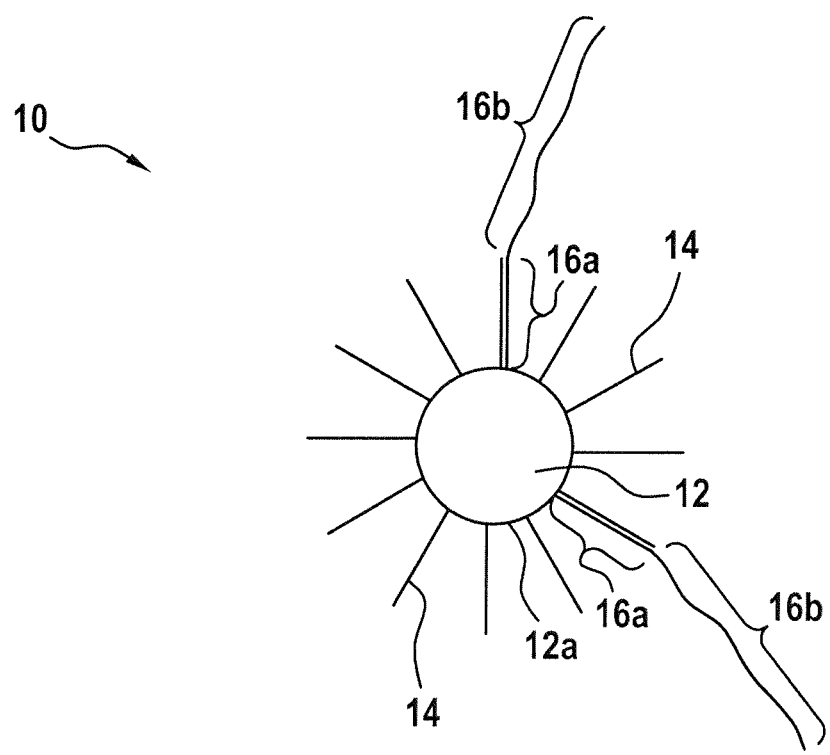

FIGS. 1A and 1B show a system 10, in which the local heating element 12 is formed as a nanoparticle 12a. In particular, a plurality of systems 10 can be provided in the reaction solution 20, wherein the nanoparticles 12a are preferably present as colloidal nanoparticles 12a in the reaction solution. The connection nucleic acids 14 are attached to the surface of the nanoparticle 12a, for example by means of thiol linkers. If the functionalized nanoparticles 12a and the primer nucleic acids 16 are provided separately in the reaction solution, they are present at least partially separated from each other in the reaction solution, as represented for example in FIG. 1A. If the temperature of the reaction solution, in particular in the surrounding around the at least one local heating element 12 or around the at least one nanoparticle 12a, is lower than the denaturation temperature, preferably much lower than the denaturation temperature, and particularly preferably approximately corresponds to the annealing temperature, primer nucleic acids 16 of the plurality of primer nucleic acids 16 can bind to the connection nucleic acids 14, with the result that at least a part of the primer nucleic acids 16 is bonded to the nanoparticle 12a via the connection nucleic acids 14. The time which is necessary until a particular part or a particular number of primer nucleic acids 16 binds to the functionalized nanoparticles 12a can depend on different parameters, such as for instance a temperature of the reaction solution, as well as a concentration of the primer nucleic acids 16 and/or the functionalized nanoparticles 12a in the reaction solution, and/or a density with which the connection nucleic acids 14 are attached to the nanoparticles 12a and/or a concentration of salts.

Figure 1C:
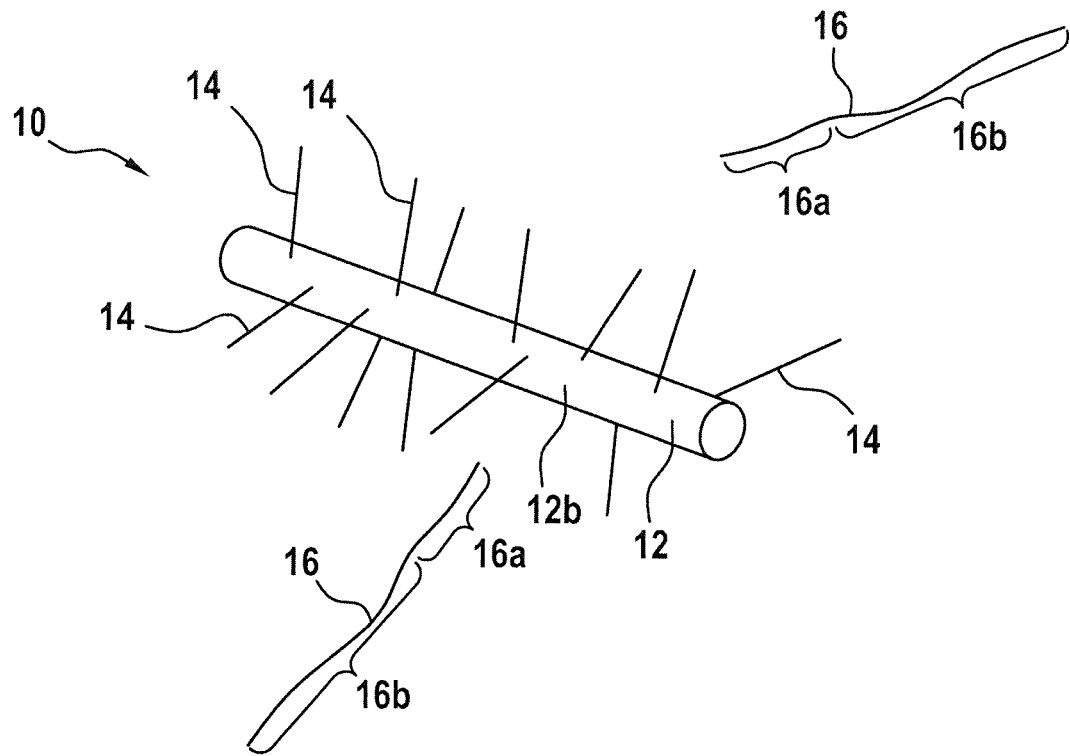
Figure 1D:
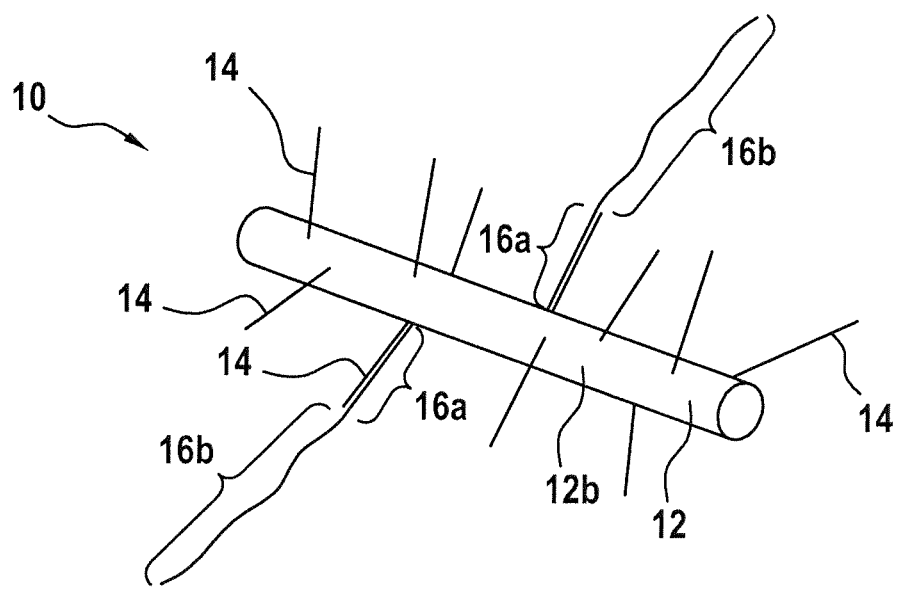

FIGS. 1C and 1D show a modification of the first preferred embodiment of the system 10, which corresponds in the essential parts to the embodiment shown in FIGS. 1A and 1B, wherein deviating therefrom the local heating element 12 is formed as a resistive micro heating element 12b. In particular, the micro heating element 12b can be formed as a microwire. Although FIGS. 1C and 1D schematically represent only a short section of a micro heating element 12b, a length of the micro heating element 12b can be much longer, as represented. The micro heating element 12b can be heated, for example, in that the micro heating element 12b is energized in such a way that a current flow flows substantially along a longitudinal axis of the wire through the micro heating element 12b and heats it. Corresponding to the previous preferred embodiment, several connection nucleic acids 14 are attached to the surface of the micro heating element 12b, for example by means of thiol linkers.

Figure 1E:
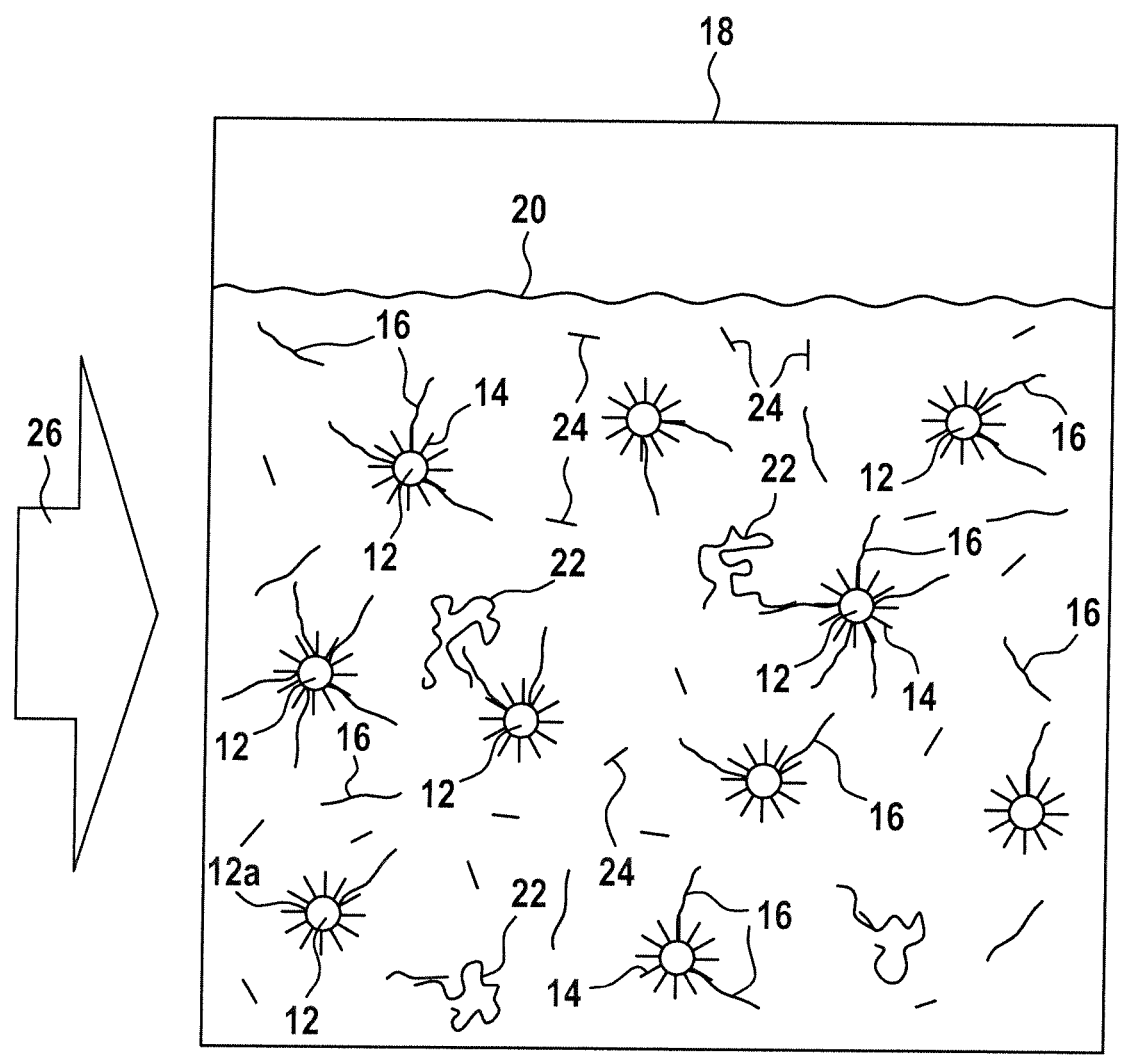

FIG. 1E shows, in a schematic representation, a reaction vessel 18, which contains a reaction solution 20. In the reaction solution 20 a plurality of local heating elements 12 are provided, which are formed in each case as nanoparticles 12a and which are functionalized in each case with several connection nucleic acids 14. Furthermore, in the reaction solution 20 a plurality of primer nucleic acids 16 are provided, which are in part located freely in the reaction solution 20 and in part bound to the nanoparticles 12a via connection nucleic acids 14. As is furthermore represented, the primer nucleic acids 16 can hybridize via the respective primer segments 16b with one of the nucleic acids 22 present single-stranded and to be amplified, and can bind thereto. This applies substantially to the same degree to primer nucleic acids 16 which are bound to connection nucleic acids 14, and to primer nucleic acids 16 which are not bound to connection nucleic acids 14, but are located freely in the reaction solution 20. In addition, still further primers 24 and/or primer nucleic acids can also be present in the reaction solution 20. For example, these further primers 24 can be formed as reverse primers, while the primer nucleic acids 16 or their primer segments 16b are formed as forward primers, or vice versa. It is also possible for further primers 24, which do not have a connection segment 16a and therefore cannot bind to the connection nucleic acid 14, to be provided in the reaction solution 20. For example, these further primers 24 can compete with the primer nucleic acids 16 that can be bound to the nanoparticles 12a.

In order that the nucleic acid 22 to be amplified is present in the reaction solution 20 as a single-stranded nucleic acid 22, it can be advantageous to carry out a global warming or heating of the reaction solution 20 to and/or above the denaturation temperature at the start or before an amplification of the nucleic acid 22 to be carried out, in order to separate the optionally doubled-stranded nucleic acids 22 into individual strands first. Furthermore, a heating of the reaction solution at the start of and/or before an amplification of the nucleic acid 22 to be carried out, for example by a global warming or heating of the reaction solution 20, can be advantageous or even necessary, in particular if, for example, so-called hot-start enzymes are used, which have to be activated by the action of heat first, and/or if components, such as for instance enzymes, are supposed to or have to be deactivated before the actual amplification of the nucleic acid 22.

The denaturation needed for the PCR or for the amplification of the nucleic acids 22 is effected by an optical excitation of the nanoparticles 12a, whereby the nanoparticles 12a and/or a local surrounding of the nanoparticles 12a are heated to and/or above the denaturation temperature, while substantially the remainder of the reaction solution 22 is not heated by the optical excitation 26 of the nanoparticles 12a, but remains at a lower temperature. Particularly preferably, this lower temperature of the reaction solution is chosen such that it substantially corresponds to an annealing temperature, which enables an elongation by means of the polymerase and/or a hybridization of single-stranded nucleic acids and/or a binding of primer nucleic acids 16 to connection nucleic acids 14. The optical excitation 26 can be effected, for example, by a irradiation of optical radiation into the reaction solution 20, for which the reaction vessel 18 is advantageously at least partially transparent for the optical radiation, wherein the optical radiation spectrally overlaps at least partially with an absorption spectrum of the nanoparticles 12a and is chosen such that it is substantially not absorbed by the reaction solution, apart from the nanoparticles 12a in the reaction solution. It is understood that the embodiment shown in FIG. 1E can also be used with micro heating elements 12b as local heating elements 12 in combination with or instead of nanoparticles 12a, although this is not represented in its own figure.

Figure 2:
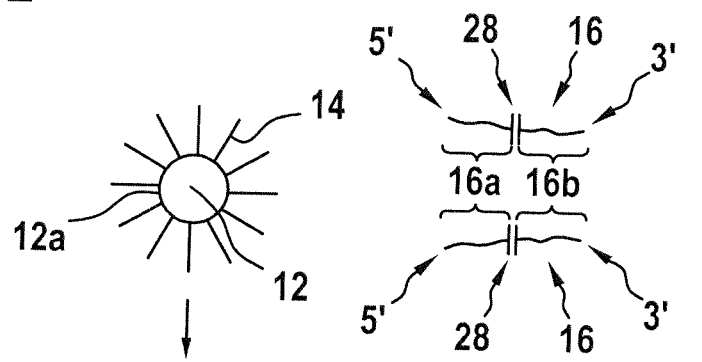
FIG. 2 shows, in a schematic representation, an example of a procedure according to the first preferred embodiment.
Figure 2:
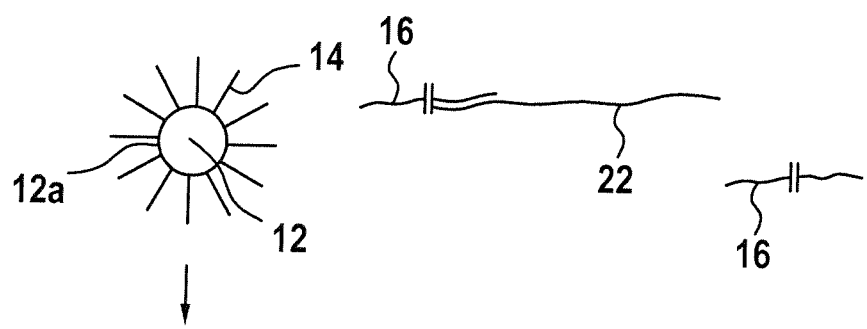
Figure 2:
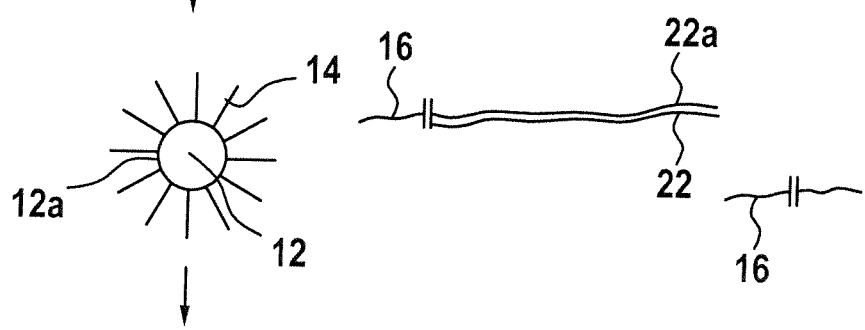
Figure 2:
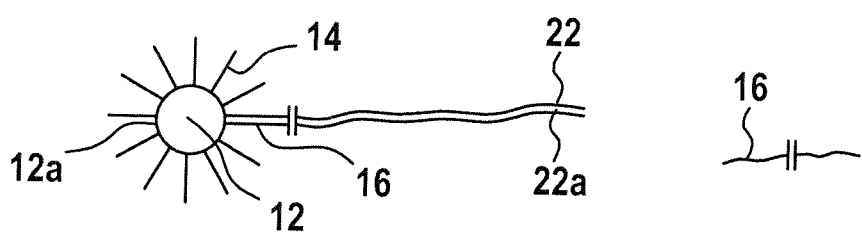
Figure 2:
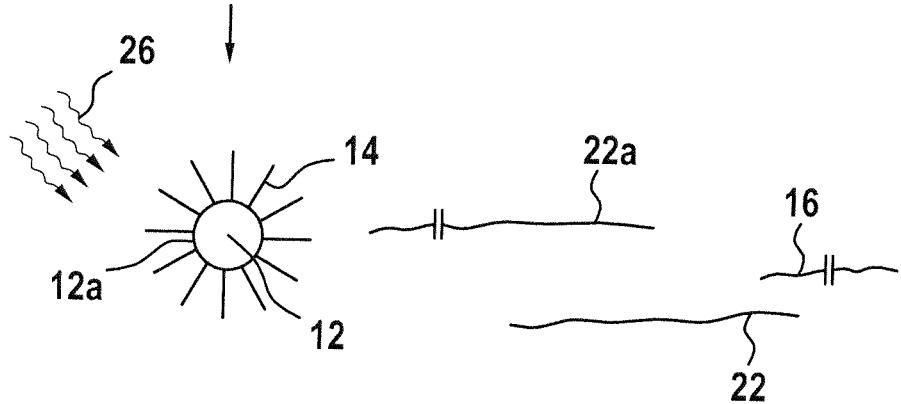

In the following, the first preferred embodiment is explained with reference to FIG. 2 in detail, in particular a method for amplification of the nucleic acid according to the first preferred embodiment.

According to the first preferred embodiment at least one local heating element 12 and at least one primer nucleic acid 16 are provided separately from each other in the reaction solution 20 at the start in step a). Preferably, in the reaction solution 20 there are a plurality of local heating elements 12 and a plurality of primer nucleic acids 16, of which preferably some are formed as forward primers and others as reverse primers for the PCR, wherein however both the forward primer-primer nucleic acids and the reverse primer-primer nucleic acids are preferably formed with a connection segment 16a, which can bind to the connection nucleic acids 14.

According to a preferred embodiment the local heating elements 12 are in each case formed as a nanoparticle 12a and functionalized with connection nucleic acids 14.

Local heating elements 12 which are similar in particular with respect to the nanoparticles 12a and with respect to the connection nucleic acids 14 functionalized thereon are regarded as a sort of local heating elements 12. The connection nucleic acids 14 are attached (e.g. via a 3'-thiol binding) to the particle surface in such a way that the 5' end of the respective connection nucleic acids 14 is at a distance from the nanoparticle 12a. The connection nucleic acids 14 themselves preferably do not serve as primers for the amplification of the nucleic acids or for the PCR. Rather, the nanoparticles 12a are usable in a multifunctional way such that optionally different primer nucleic acids 16 can bind to the connection nucleic acids 14.

As the optothermal heating of the nanoparticles 12a, i.e. the heating of the nanoparticles 12a by means of optical excitation, to reach or exceed the denaturation temperature for the amplicon takes place only locally during the amplification method and the entire reaction solution 20 need not be heated to the denaturation temperature, it is necessary that the amplicon be bound to the surface of the nanoparticles via at least one primer nucleic acid 16 and one connection nucleic acid 14 for the denaturation.

In order to be able to bind the nucleic acid 22 to be detected or the amplicon to the nanoparticles 12a functionalized with connection nucleic acids 14, at least one of the two primer sequences necessary for the PCR (preferably both primer sequences) have, in addition to the primer segment 16b, a connection segment 16a, such as for instance an overhang at the 5' end, which is complementary to at least some of the connection nucleic acids 14 on the nanoparticles 12a. The 3' end of the primer sequences or of the primer nucleic acids 16 or of their primer segments 16b is preferably kept free, with the result that the primer nucleic acids 16 can be elongated by the polymerase starting from this side.

Preferably, between the primer segment 16b and the connection segment 16a of a respective primer nucleic acid 16 there are one or more abasic modifications 28, in order to prevent the polymerase from overwriting the connection segments 16a or forming the complement to the connection segments 16a. This is relevant in particular when the primer nucleic acids 16 are not bound to a connection nucleic acid 14, but are located in the solution separately from a connection nucleic acid 14 and a local heating element 12. The at least one abasic modification thus provides the advantage that the connection nucleic acids 14 and the connection segments 16a of the primer nucleic acids 16 are present single-stranded even in the following cycles of the PCR, i.e. almost as a single-stranded overhang sequence, and thus the amplicon or the nucleic acid 22 to be amplified can bind to the connection nucleic acids 14 on the nanoparticles 12a and can be denatured in the zones, locally heatable by optothermal heating, around the nanoparticles 12a or around the nanoparticle surface.

In step b) an annealing of at least some of the primer nucleic acids 16 with the nucleic acid 22 present single-stranded takes place, i.e. the primer nucleic acids 16 hybridize with their primer segment 16b on the nucleic acid 22 to be amplified. In order that the nucleic acid 22 is present single-stranded, a preliminary, optionally global, heating step in which, for example, the entire reaction solution 20 is heated to or above the denaturation temperature can be advantageous. This preliminary heating step can take place, for example, before step a) and/or between steps a) and b).

In step c) an elongation of the nucleic acids 22 located in the reaction solution 20 which are bound to primer nucleic acids 16 is effected. In particular, an enzymatic reaction, in which the primer segment 16b of the primer nucleic acid 16 bound to the nucleic acid 22 is elongated to form an amplicon 22a by means of a polymerase and in this way the nucleic acid 22 is completed to form the double strand, is effected here. The connection segment 16a of the primer nucleic acid 16 is preferably not included by the polymerase or completed to form the double strand, which can be achieved in particular by a provision of the at least one abasic modification 28 between the connection segment 16a and the primer segment 16b.

In step d) a binding of the nucleic acid 22 hybridized with the elongated primer nucleic acid 16 to one of the connection nucleic acids 14 on the local heating element 12 is effected. The nucleic acid 22 now present double-stranded or the amplicon 22a is thereby at least partially, but preferably completely, brought into the surrounding 29 of the local heating element 12, which can be heated by means of local heating to and/or above the denaturation temperature.

In step e) the at least one local heating element 12 is heated, which can be effected, for example in the case where the local heating element 12 is formed as a nanoparticle 12a, by means of an optical excitation 26, for example by laser radiation. The local heating element 12 as well as a surrounding 29 of the local heating element 12 is heated to and/or above the denaturation temperature, with the result that the double-stranded nucleic acids located in the surrounding 29 of the local heating element 12, i.e. the nucleic acid 22 or the amplicons 22a and/or the primer nucleic acids 16 and/or the connection nucleic acids 14, at least partially, but preferably completely, separate from each other and are at least partially, but preferably completely, present again as single-stranded nucleic acids.

With steps a) to e), therefore, an amplicon 22a was generated, whereby a complement, i.e. a nucleic acid with a nucleotide sequence at least partially complementary to the nucleic acid 22, to the nucleic acid 22 was generated. Through at least one repetition, the nucleic acid 22 can thus be copied or amplified. In FIG. 3C, by way of example, a double-stranded nucleic acid 22 to be amplified and two amplicons 22a hybridized to form a double strand are represented. At each of the two ends the double strand of the amplicons 22a has a connection segment 16a originating from the primer nucleic acids 16, by means of which the amplicon double strand can bind to one or two local heating elements 12 or their connection nucleic acids 14.

Steps a) to e) can be passed through in a plurality of cycles, for example between 20 and 1000 cycles, in particular more than 300 cycles, in order thereby to achieve an exponential amplification of the nucleic acid 22 present at the start. The order of steps b), c) and d) is not bound to the represented exemplary order, but can also be chosen differently and/or varied. The cycle can be passed through in particular often enough to achieve the desired extent of amplification. The number of passes through the cycle of the polymerase chain reaction is preferably greater than 45, particularly preferably greater than 60, particularly preferably greater than 80, particularly preferably greater than 100, particularly preferably greater than 150, particularly preferably greater than 200. With a large number of passes through, a particularly high level of amplification can advantageously be achieved.

The number of passes through the cycle of the polymerase chain reaction is preferably smaller than 1000, particularly preferably smaller than 750, particularly preferably smaller than 500. With a number of passes through the cycle that is not too high, the duration of the amplification can advantageously be reduced. Moreover, negative influences of impurities or the consumption or damage of reaction partners, such as for example a polymerase used in the method, can advantageously be kept small.

In the denaturation or in the optothermal, local heating of the nanoparticles 12a, in some circumstances, not only is the amplicon double strand of the nucleic acid 22 to be amplified denatured, i.e. the hybridization between the elongated primer nucleic acid 16 and the nucleic acid 22 is interrupted, but optionally so are double strands of a connection nucleic acid 14 and a connection segment 16a of a primer nucleic acid 16 bound thereto. Both elongated primer nucleic acids 16, thus amplicons 22a, and still non-elongated primer nucleic acids 16 can be separated again from the connection nucleic acids 14 on the nanoparticles 12a. In subsequent cycles of the PCR, new primer nucleic acids 16 can hereby bind again and again to the connection nucleic acids 14 on the nanoparticles 12a, and a constant exchange of primer nucleic acids 16 on the connection nucleic acids 14 on the nanoparticles 12a can preferably result. It can thus be achieved that primer nucleic acids 16 can be added to the reaction solution 20 in excess, thus more primer nucleic acids 16 with in each case a connection segment 16a can be present in the reaction solution 20 than can simultaneously bind to the connection nucleic acids 14 on the nanoparticles 12a. This can be advantageous, for example, in order to speed up the dynamics of the amplification reaction for instance.

It can preferably also be achieved hereby that the actual elongation of the primer nucleic acids 16 by the polymerase need not necessarily take place in the vicinity of the nanoparticles 12a, in particular via the connection nucleic acids 14 bound to the nanoparticles 12a, where, in certain circumstances, quite different ion and charge distributions can prevail from those in other partial volumes of the reaction solution at a greater distance from the nanoparticles 12a. This is because the process in which a primer nucleic acid 16 finds an amplicon 22a or a nucleic acid 22 to be amplified and is elongated by the polymerase can optionally also take place a long way away from the local heating elements 12 or nanoparticles 12a or the nanoparticle surface and then this amplicon created in this way with at least one projecting connection segment 16a can bind to the connection nucleic acids 14 on the nanoparticles 12a.

According to a further preferred embodiment, in the reaction solution 20 there are at least two different types or sorts of primer nucleic acids 16, of which some are formed as forward primers and others are formed as reverse primers, which coincide with respect to their connection segment 16a, however, and which are thus suitable in principle to bind to the same connection nucleic acids 14.

In a further preferred embodiment, in the reaction solution 20 there are first primer nucleic acids 16, which are formed as forward primers and have a first nucleotide sequence in their connection segment 16a, and second primer nucleic acids 16, which are formed as reverse primers and have a second nucleotide sequence different from the first nucleotide sequence in their connection segment 16a. Further, according to this preferred embodiment, there are preferably either a nanoparticle sort which has two different connection nucleic acids 14, wherein a first connection nucleic acid 14 is complementary to the first nucleotide sequence and a second connection nucleic acid 14 is complementary to the second nucleotide sequence, or preferably two different types of nanoparticles 12a, which in each case have only one type of connection nucleic acids 14 which are at least partially complementary either to the first nucleotide sequence or to the second nucleotide sequence.

In a further preferred embodiment, in the reaction solution 20 there are at least two different combinations of forward primer- and reverse primer-primer nucleic acids 16, which, although they differ with respect to their primer segments 16b, have substantially identical connection segments 16a. A combination of forward primer- and reverse primer-primer nucleic acids 16, i.e. a primer pair, is defined in that together a double-stranded amplicon 22a can be generated and/or amplified.

In another embodiment, in the reaction solution 20 there are at least two different combinations of forward primer- and reverse primer-primer nucleic acids 16, which have connection segments 16a at least partially different from each other, and a corresponding number of different types of local heating element 12, which in each case bear the connection nucleic acids 14 complementary to the different connection segments 16a. In a further preferred embodiment, in the reaction solution there are several primer pairs, which differ from each other with respect to their connection segments and/or with respect to their primer segments.

In a further preferred embodiment, in the reaction solution 20 there is a primer pair, in which only either the forward primer or the reverse primer is provided with a connection segment 16a, while the other primer has no connection segment 16a. According to a further preferred embodiment, in addition to this, primer pairs can be provided in the reaction solution, in which neither the forward primer nor the reverse primer has a connection segment 16a.

Figure 3A:
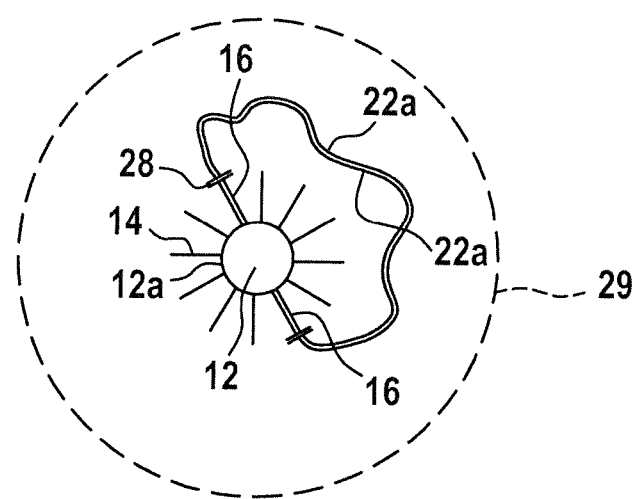
FIGS. 3A to 3C show, in schematic representations, explanations of partial aspects of the first preferred embodiment.

According to some preferred embodiments it can happen that the amplicon 22a or the nucleic acid 22 to be amplified is bound to a local heating element 12 or to a nanoparticle 12a with two primer nucleic acids 16, e.g. if both forward primer-primer nucleic acid 16 and reverse primer-primer nucleic acid 16 are equipped with the same connection segment 16a, or both connection segments 16a (that of forward primer-primer nucleic acid 16 and reverse primer-primer nucleic acid 16 with different connection segments 16) can bind to a type of local heating element 12 or nanoparticle 12a, which are functionalized for instance with both corresponding connection nucleic acids 14, as represented by way of example in FIG. 3A. An amplicon 22a is bonded as a double strand of an elongated primer pair, in particular of an elongated forward primer-primer nucleic acid 16 and an elongated reverse primer-primer nucleic acid 16, via two connection nucleic acids 14, to the same local heating element 12. This preferably has the result that the amplicons are at least partially, preferably completely, located within the surrounding 29 of the local heating element 12, which can be heated by the local heating element 12 to and/or above the denaturation temperature.

This can furthermore result in the amplicon 22a or the nucleic acid 22 to be amplified being able to be dehybridized, for example, better and/or more homogeneously and/or at a lower excitation power density, for example at a lower laser excitation density if the local heating elements 12 are excited optically by means of laser radiation, as the amplicon 22a on average over its length is brought closer to the local heating element 12 or the nanoparticle surface than in a case where it is bound only to one primer nucleic acid 16 or only at one end on a local heating element 12 or a nanoparticle 12a, as the heating of the surrounding 29 decreases as the distance from the particle surface increases.

Figure 3B:
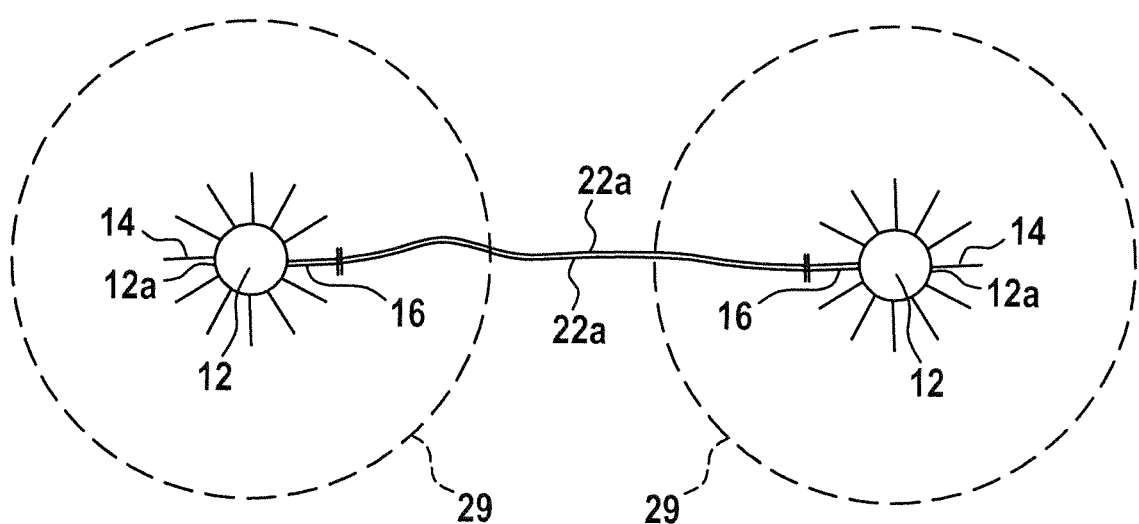
Figure 3C:
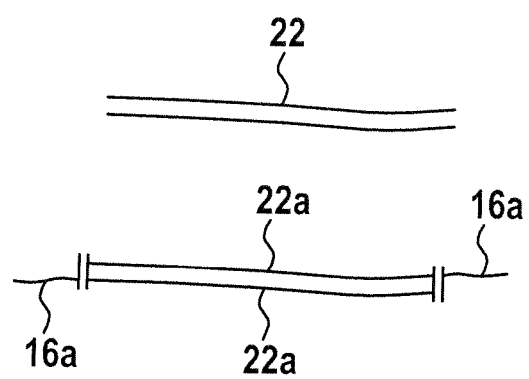

According to some preferred embodiments it can also happen that the amplicon is bound with two primer nucleic acids 16 between two local heating elements 12 or between two nanoparticles 12a, e.g. if both forward primer-primer nucleic acid 16 and reverse primer-primer nucleic acid 16 are provided with corresponding connection segments, as represented by way of example in FIG. 3B. This can likewise result in the amplicon 22a being able to be dehybridized, for example, better and/or more homogeneously and/or at a lower excitation power density, as the amplicon 22a or the amplicons 22a are heated from both sides, in contrast to the heating from only one side, which exists in the case where the amplicons 22a are bound with a primer nucleic acid 16 only at one end on a local heating element 12 or on only one nanoparticle 12a.

Preferably, the primer nucleic acids 16 and the local heating elements 12 functionalized with connection nucleic acids 14 are added simultaneously or one after another to the reaction solution 20 for the amplification reaction.

In a further embodiment the primer nucleic acids 16 are first hybridized to the connection nucleic acids 14 on the local heating elements 12 and then immobilized on the connection nucleic acids 14 in such a way that the primer nucleic acids 16 can no longer detach from the respective connection nucleic acid 14 or from the local heating element 12 even during the denaturation step. This immobilization can be effected e.g. in that primer segments 16b of the primer nucleic acids 16 and/or the connection nucleic acids 14 have modifications (such as e.g. at least one amino group), which are then bonded by means of a chemical reaction e.g. with d-linkers (BS3-(bis(sulfosuccinimidyl) suberate)) sufficiently securely such that their binding is retained even at temperatures which are equal to or higher than the denaturation temperature. Alternatively or additionally, the immobilization can be effected by means of click chemistry, for example by means of at least one azide modification and an alkyne modification. Optionally, an excess, binding reagent for the chemical reaction for the immobilization and/or excess unbound primer nucleic acids 16 can be removed from the reaction solution 20 before the amplification reaction, e.g. by washing and/or purification and/or filtering and/or centrifugation.

Although some of the preferred embodiments just represented were explained exclusively or mainly as embodiments in which the local heating elements 12 are formed as nanoparticles 12a, it goes without saying that they are likewise regarded as preferred embodiments of the invention if they are realized additionally or alternatively with micro heating elements 12b as local heating elements 12.

Figure 4A:
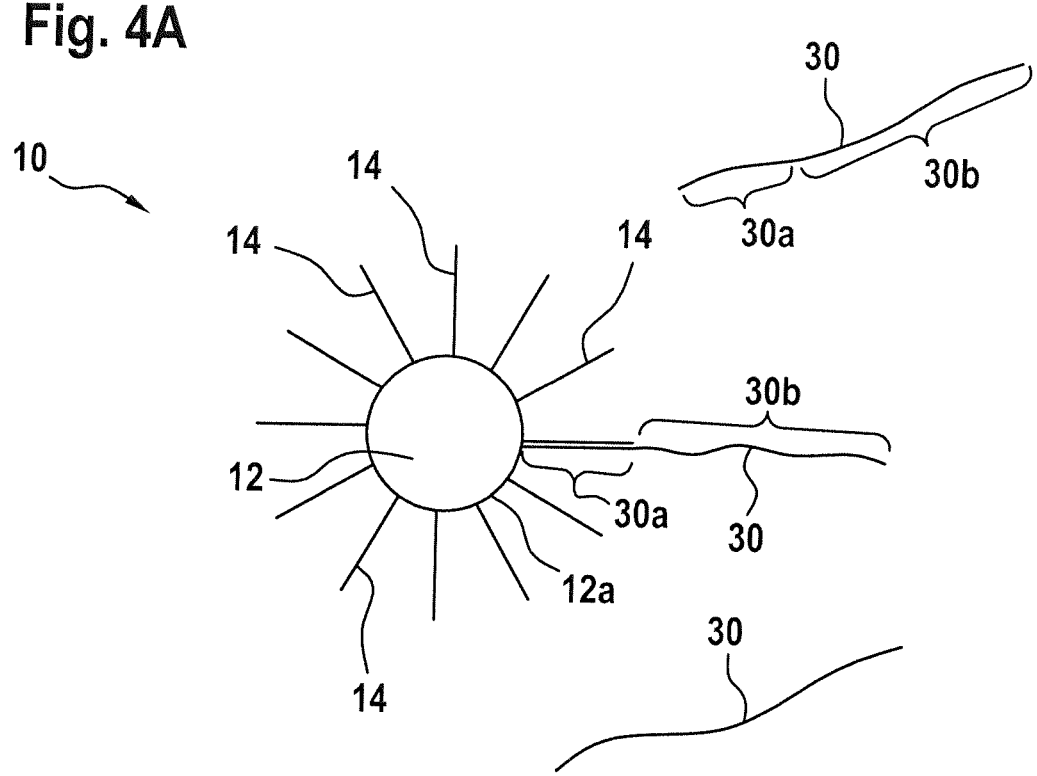
FIGS. 4A to 4D show, in schematic representations, a second preferred embodiment of the invention.

In the following, a second preferred embodiment is explained, which is represented by way of example in FIGS. 4A to 4D. This deviates from the first preferred embodiment in particular in that, as an alternative or in addition to the primer nucleic acids 16, primer complementary nucleic acids 30 are provided in the reaction solution 20. As represented in FIG. 4A, the primer complementary nucleic acids 30 have a connection segment 30a and a primer complementary segment 30b. The connection segment 30a serves, corresponding to the connection segment 16a of the primer nucleic acids 16, to make it possible for the primer complementary nucleic acids 30 to bind to the connection nucleic acids 14 or the local heating elements 12.

Figure 4B:
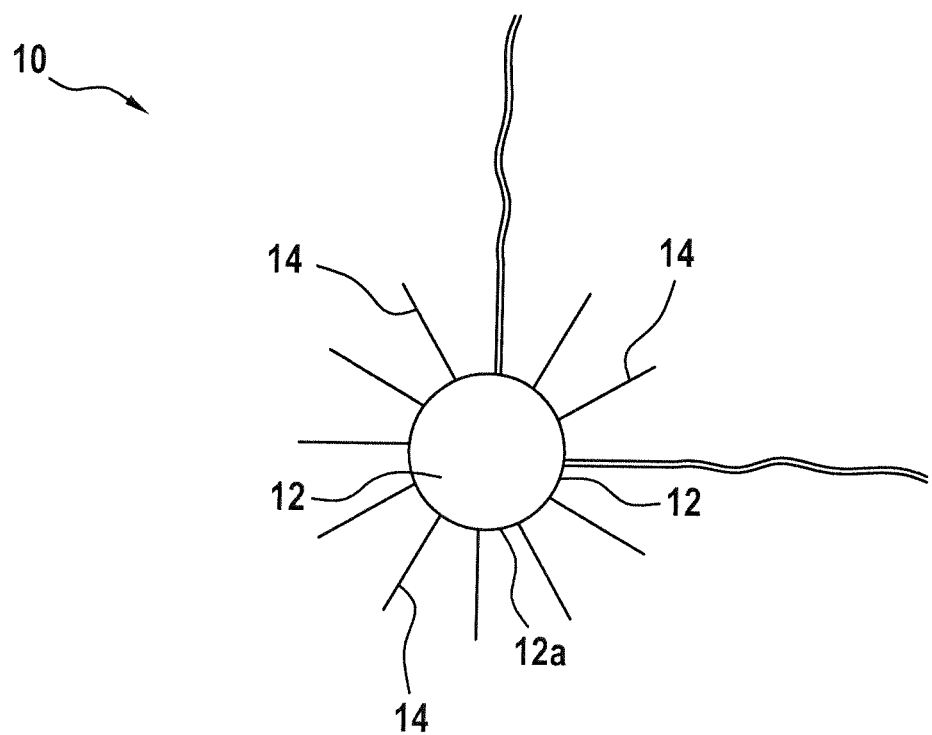

As represented in FIG. 4B, if a primer complementary nucleic acid 30 is bound to a connection nucleic acid 14, the connection nucleic acid 14 can be elongated by a primer nucleotide sequence or a primer segment which is at least partially, preferably completely, complementary to the primer complementary segment 30b by means of an enzymatic reaction, for example by a polymerase. Thus, for example, a universal connection nucleic acid 14 which has no primer properties can be provided with a primer functionality with the aid of a primer complementary nucleic acid 30 and/or can be functionalized or elongated to form a primer nucleic acid or a primer. Through a global heating of the reaction solution 20 and/or through a local heating of the local heating elements 12 the primer complementary nucleic acids 30 can then be separated from the elongated connection nucleic acids 14, with the result that the elongated connection nucleic acids 14 are present single-stranded and/or can be used as primers for an amplification reaction. In the embodiment shown in FIGS. 4A and 4B the local heating elements 12 are formed as nanoparticles 12a.

Figure 4C:
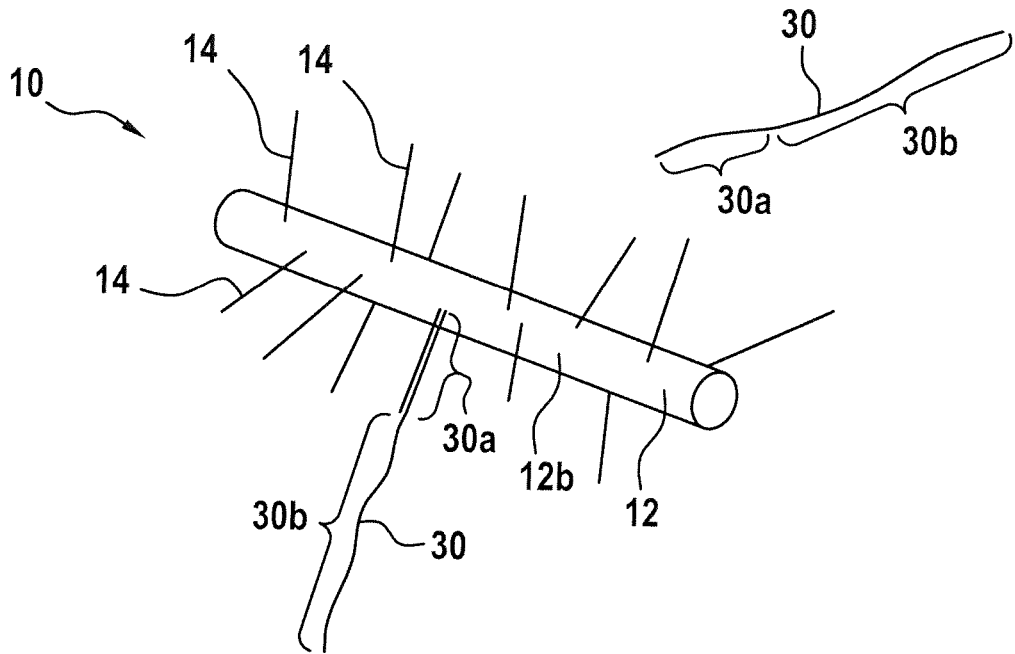
Figure 4D:
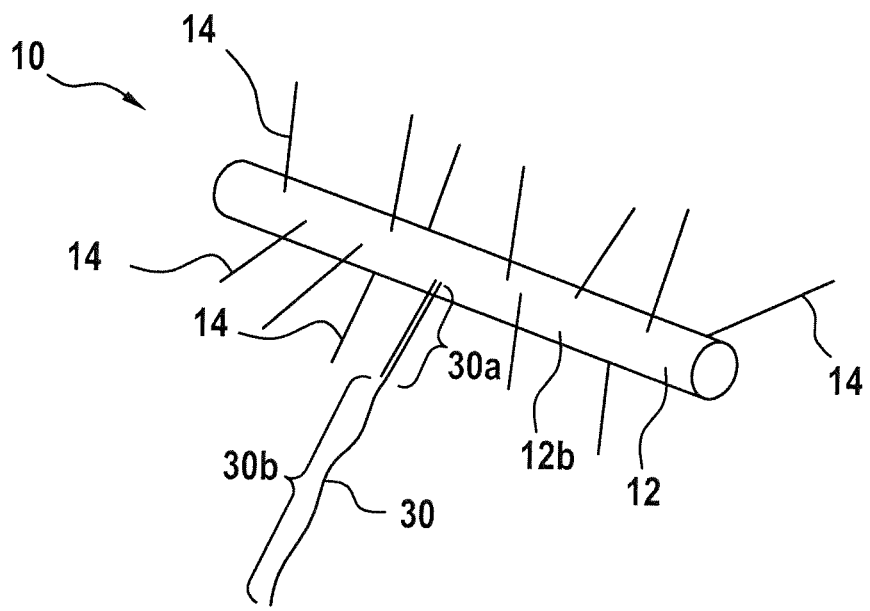

FIGS. 4C and 4D show a modification of the second embodiment from FIGS. 4A and 4B, in which the local heating elements 12 are formed as micro heating elements 12b, in particular as micro heating wires.

Figure 5:
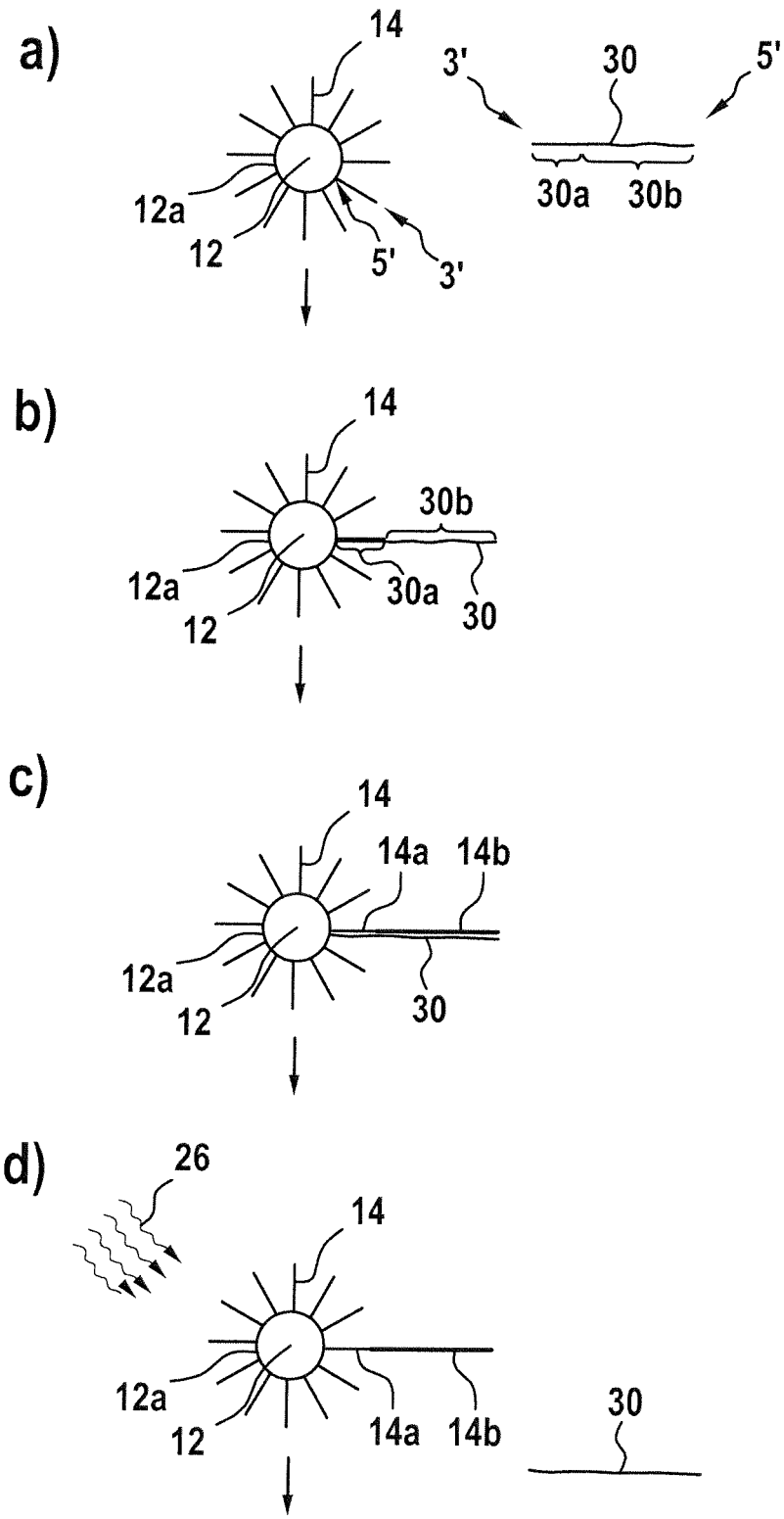
FIG. 5 shows, in a schematic representation, an example of a procedure according to the second preferred embodiment.

In FIG. 5 the individualization or functionalization of local heating elements 12 functionalized with connection nucleic acids 14 is represented by way of example. Although the steps represented and explained are demonstrated with the aid of an embodiment in which the local heating elements 12 are formed as nanoparticles 12a, it goes without saying that this also applies to other embodiments, in which local heating elements 12 are additionally or alternatively formed as micro heating elements 12b.

In step a) local heating elements 12 functionalized with connection nucleic acids 14 and, separately from these, primer complementary nucleic acids 30 are provided in the reaction solution 20. Preferably, in a first part of the primer complementary nucleic acid 30 starting with the 3' end a connection segment 30a extends, followed by a primer complementary segment 30b which extends preferably up to the 5' end of the primer complementary nucleic acid 30. Preferably, the connection nucleic acids 14 are furthermore attached with their 5' end on the local heating element 12 or on the nanoparticle 12a or on the nanoparticle surface, with the result that the connection nucleic acids 14 and the connection segments 30a are present in a suitable orientation relative to each other in order to make a hybridization possible.

In step b) an annealing or a hybridization is effected, in which the connection nucleic acid 30 binds to one of the connection nucleic acids 14, and thereupon is bonded to the local heating element 12 or nanoparticle 12a.

In step c) an elongation of the connection nucleic acid 14 which is bound to the primer complementary nucleic acid 30 is effected. The elongation is preferably effected by a chemical reaction, preferably by means of an enzyme, such as for instance a polymerase. The connection nucleic acid 14 is elongated in such a way that the elongated part is complementary to the primer complementary segment 30b of the primer complementary nucleic acid 30 and therefore at least partially, but particularly preferably completely, has a nucleotide sequence which can be used as primer for the amplification of the nucleic acid 22. The original connection nucleic acid 14 can furthermore serve as a connection segment 14a of the elongated connection nucleic acid 14.

In step d) a denaturation is effected, with the result that the primer complementary nucleic acid 30 separates from the elongated connection nucleic acid 14 and thereupon the primer complementary nucleic acid 30 and the elongated connection nucleic acid 14 bound to the local heating elements 12 are in each case present single-stranded in the reaction solution 20. The denaturation can be effected for example by a global heating of the reaction solution 20 to or above the denaturation temperature, or by a local heating of the local heating element 12 and the surrounding 29 of the local heating elements to or above the denaturation temperature, for example by means of an optical excitation of the local heating elements 12 formed as nanoparticles 12a, while a temperature of the reaction solution outside the locally heated surrounding 29 remains substantially or virtually unchanged. Preferably, the reaction solution outside the locally heated surroundings 29 of the local heating elements 12 and preferably also inside the surroundings 29 outside the denaturation times, in which the local heating elements 12 are heated, has a temperature which substantially corresponds to an elongation temperature and/or an annealing temperature.

The local heating elements 12 individualized or functionalized with steps a) to d) with a primer functionality can then be used as primers, in particular within the framework of a laser PCR, such as is known for example from DE 10 2012 201 475 A.

According to the second preferred embodiment a generation of primers by an enzymatic elongation of connection nucleic acids 14 which are functionalized on local heating elements 12 is thus effected first for the amplification of the nucleic acid. For this, in the reaction solution 20 there is at least one sort or type of local heating element 12, such as for instance nanoparticles 12a, which are functionalized with connection nucleic acids 14. The connection nucleic acids 14 are attached to the nanoparticle surface or to the local heating element 12 in such a way (e.g. via a 5'-thiol binding) that the 3' end is at a distance from the nanoparticle 12a or from the local heating element 12. Without further elongation the connection nucleic acids 14 preferably do not serve as primer sequence. This sort or type of nanoparticle 12a or local heating element 12, i.e. the local heating element 12 or nanoparticle 12a which are functionalized with universal connection nucleic acids 14, are thus usable in a multifunctional manner and not earmarked for the amplification of a particular, specific nucleic acid 22.

Rather, the local heating elements 12 first become specifically functionalized local heating elements 12 by an enzymatic reaction. For this, in the reaction solution 20 the universally usable local heating elements 12 which are functionalized with universal connection nucleic acids 14 are mixed with primer complementary nucleic acids 30, which expressed in other words serve as primer templates. The primer complementary nucleic acids 30 consist of two partial sequences. Read from 5' to 3', the primer complementary segment 30b which is at least partially, but preferably completely, complementary to the primer sequence which is to be generated at the 3' end of the connection nucleic acids 14 comes first. This is followed by the connection segment 30a which is at least partially complementary to the connection nucleic acids 14 on the local heating elements 12.

If a primer complementary nucleic acid 30 hybridizes with a connection nucleic acid 14 on the local heating element, an enzyme located in the reaction solution 20, such as for instance a DNA polymerase, can extend the connection nucleic acid 14 at the 3' end with the aid of the likewise present dNTPs (deoxyribonucleoside triphosphates). An oligonucleotide bound to the local heating element 12 thereby forms, which comprises, from 5' to 3', a connection segment 14a, which substantially corresponds to the original connection nucleic acid 14, and a desired primer segment 14b, which has the desired primer functionality. The connection segment 14a can preferably function as a spacer or distance holder, which preferably has the effect that the primer segment 14b is preferably located at a greater distance from the surface of the local heating element 12 or the nanoparticle 12a.

On the primer segment 14b the target or the nucleic acid 22 to be amplified can then hybridize, with the result that an amplification can be carried out by means of the known laser PCR, such as is known from DE 10 2012 201 475 A for nanoparticles provided already specifically functionalized.

In a further preferred embodiment the connection nucleic acid 14 can have at least one abasic modification 28, which prevents a complete or partial overwriting of the connection nucleic acid 14 by the polymerase in later PCR cycles. This abasic modification can, for example, be spaced apart from the 3' end of the connection nucleic acid 14 by a few nucleotide bases.

In a further preferred embodiment, in the reaction solution 20 there are first primer complementary nucleic acids 30, which serve as forward primer templates, and second primer complementary nucleic acids 30, which serve as reverse primer templates, wherein the first and the second primer complementary nucleic acids 30 are preferably provided in each case with the same connection segment 30a.

In a further preferred embodiment, in the reaction solution 20 there are first primer complementary nucleic acids 30, which are formed as forward primer templates which have a connection segment 30a with a first nucleotide sequence, and second primer complementary nucleic acids 30, which are formed as reverse primer templates and have a connection segment 30a with a second nucleotide sequence. Further, in this embodiment there are either one type or sort of local heating elements 12, which has two types of connection nucleic acids 14 (a first complementary to the first and a second complementary to the second primer complementary nucleic acids 30) or at least two types or sorts of local heating elements 12, which have in each case either only a connection nucleic acid 14 complementary to the first or only a connection nucleic acid 14 complementary to the second primer complementary nucleic acids 30. In addition, a combination of these embodiments can also be advantageous.

In a further preferred embodiment, in the reaction solution 20 there are at least two primer template pairs, which at least partially have the same nucleotide sequences in the connection segments 30a, the primer complementary segments 30b of which, however, are specific to an amplification of different nucleic acids 22.

In a further preferred embodiment, in the reaction liquid 20 there are at least two different types of primer template pairs, which differ with respect to their connection segments 30a, and a corresponding number of types of differently functionalized local heating elements 12, the connection nucleic acids 14 of which are at least partially complementary to a type of primer template pair.

In the case of the use of a polymerase which generates A overhangs at the 3' end (e.g. Taq polymerase), the primer sequence should preferably be chosen such that the first nucleotide, which adjoins the primer sequence, is an adenine, otherwise the elongation may be disrupted. In other words, it can be advantageous, in the case of the use of a polymerase which generates A overhangs at the 3' end, to carry out the selection of the primer sequence in such a way that during the elongation of the primer an adenine base would follow in any case, in order to compensate for the A overhang virtually beforehand in this way.

In order to achieve a hybridization of the primer complementary nucleic acids 30 on the connection nucleic acids 14 that is as complete as possible at the start or before the start of the amplification reaction or PCR, it can be advantageous to preincubate the local heating elements 12 with connection nucleic acids 14 attached thereto and the primer complementary nucleic acids 30 under altered conditions compared with the conditions which prevail or are advantageous during the amplification reaction. For example, for the incubation a different salt concentration in the reaction solution 20, for example a higher salt concentration (e.g. 15-20 mM $MgCl_2$), and/or a different temperature of the reaction solution 20, for example a lower temperature (e.g. between 20 and 50° C.), can be advantageous. In this embodiment it can be advantageous that further reagents for the PCR or laser PCR and/or the target or the nucleic acid 22 to be amplified are added only after such a preincubation, and then the actual amplification reaction is started.

In a further preferred embodiment the elongation or individualization or functionalization of the connection nucleic acids 14 functionalized on the local heating elements 12, i.e. a synthesis of the primers bound to the local heating element, by an enzyme with the aid of the primer complementary nucleic acids 30 takes place in a first reaction and the amplification reaction, in which the target and/or the amplicon 22a or the nucleic acid 22 to be amplified are amplified, takes place in a subsequent second reaction. The first and the second reactions can here take place e.g. under different chemical and/or thermal conditions and/or using different polymerases and/or nucleosides, but they can also take place under identical conditions either simultaneously and/or in parallel and/or in succession. In the first reaction the synthesis of the primers bound to the local heating elements 12 by an enzyme can be effected in one step or in several cyclically repeated steps, e.g. by repeated (global or local) warming or heating, whereby the double strands formed on the local heating element 12 by elongation of the connection nucleic acids 14 complementary to the primer complementary segment 30b of the primer complementary nucleic acids 30 are denatured again and again, and in the following cycle are available again as free primer templates for the generation of new primers on other connection nucleic acids 14. This provides the advantage that smaller quantities of primer complementary nucleic acids 30 can be sufficient. This can be advantageous, for example, as smaller quantities of primer complementary nucleic acids 30, i.e. primer templates, for a subsequent amplification reaction, in which a target and/or an amplicon 22a or the nucleic acid 22 to be amplified are amplified, optionally have a smaller (negative) impact on the amplification reaction.

In a further preferred embodiment excess, unbound primer templates or primer complementary nucleic acids 30 and/or dehybridized primer templates or primer complementary nucleic acids 30 and/or further reaction partners, such as e.g. enzymes (e.g. polymerase) and/or nucleosides, can be removed from the reaction solution 20 before the start of the second reaction, i.e. before the amplification of the nucleic acid 22, for example by washing and/or purification and/or filtering and/or centrifugation.

In a further preferred embodiment, after the first reaction, in which the primers were synthesized, the primer templates or primer complementary nucleic acids 30 can be digested and/or destroyed and/or dissected and/or broken up in a second reaction, for example, by an enzyme, with the result that they can have a smaller (negative) impact in a third reaction, in which a target and/or an amplicon 22a or the nucleic acid 22 are amplified. For example, primer templates which contain the nucleotide uracil can be broken up by the enzyme uracil-DNA glycosylase (UDG), as uracil is hydrolysed by this enzyme in a targeted manner. Alternatively or additionally, for example primer templates which contain RNA nucleotides can be broken up by the enzyme RNase H2, as they can be destroyed by the enzyme RNase H2. In a further embodiment enzymes and/or primer templates can be removed from the reaction solution 20 before the start of the third reaction, e.g. by washing and/or purification and/or filtering and/or centrifugation.

It can be advantageous to provide the primer complementary nucleic acid at least partially with uracil bases instead of with thymine bases, in order to be able to carry out a breaking-up of the primer complementary nucleic acid or at least its primer complementary segments by means of UDG after an elongation of the connection nucleic acids. It can be particularly advantageous if, for a subsequent amplification of the nucleic acid or PCR, no uracil nucleosides are provided, in order to avoid a dissection or decomposition or breaking-up of nucleic acids other than the primer complementary nucleic acids by the UDG.

If the primer templates or the primer complementary nucleic acids 30 are not removed or are not completely removed before the amplification reaction, in which a target and/or an amplicon 22a or the nucleic acid 22 are amplified, they can compete, for example, with the amplicon 22a in the sense that they compete in the PCR with the target and/or the amplicon 22a for the binding to the elongated connection nucleic acid 14. The concentration of primer templates or primer complementary nucleic acids 30 in the reaction solution 20 may therefore optionally be chosen to be not too high in such a case, because the amplification could otherwise be at least partially inhibited. For some preferred embodiments, for example, concentrations of the primer complementary nucleic acids 30 of 5-10 nM can be suitable.

Over the course of time, however, the primer templates or the primer complementary nucleic acid 30 can be gradually broken down during binding to the newly formed, particle-bound amplicon strand 22a by the 5'-3' exonuclease activity of the DNA polymerase, if this elongates e.g. the reverse primer after its binding to the particle-bound amplicon strand. In this case, optionally, reverse primers and complementary forward primer nucleic acids 30 could under certain circumstances both bind to the identical or the same strand of the amplicon 22a. If the reverse primer is then elongated at its 3' end according to the template of the amplicon 22a, the enzyme can optionally reach the complementary forward primer nucleic acid 30 at any time and can then optionally, depending on the enzyme, because of the so-called 5'-3' exonuclease activity, decompose for example the complementary forward primer nucleic acid 30 and/or remove it from the amplicon.

The embodiments demonstrated in the following apply both to the first and to the second preferred embodiment equally:

Preferably, the connection nucleic acids 14 and/or the primer nucleic acids 16 and/or the primer complementary nucleic acids 30 consist at least partially, but preferably completely, substantially of DNA, in particular of oligonucleotides. Substantially completely here means that these nucleic acids are considered as consisting of DNA, irrespective of whether they have optionally abasic modifications and/or linker elements, such as for instance thiol linkers. Both connection segments 16a and 30a and connection nucleic acids 14 and the primer segments 16b and/or the primer complementary segments 30b can, however, also consist of or comprise e.g. RNA, PNA, LNA or similar. They can also contain modifications.

Preferably, the nucleotide sequences of the connection nucleic acid 14 and/or of the primer nucleic acid 16 and/or of the primer complementary nucleic acid 30, in particular their connection segments 14a, 16a or 30a, comprise repetitive sequences, i.e. they comprise multiple repetitions of short partial sequences such as e.g. ten repetitions of the partial sequence TTTG or CAAA. Connection nucleic acid 14 and primer complementary nucleic acid 30 can, however, in each case also comprise only one nucleotide type, such as e.g. 30 adenine bases or 30 thymine bases. The latter embodiments with a very high proportion of adenine or thymine bases can, however, be less suitable for some embodiments, as they could be disrupted and/or blocked under certain circumstances e.g. by poly-A carrier RNA (such as is used e.g. in the nucleic acid preparation multiple times to improve the yield and frequently consists of multiple adenine sequences). The nucleotide sequence in the connection nucleic acids 14 and/or primer nucleic acids 16 and/or the primer complementary nucleic acids 30 preferably have a suitable length in order that their hybridization is sufficiently dynamic and efficient in the given hybridization conditions. In particular, the respective lengths of the connection nucleic acids 14 and/or of the primer nucleic acids 16 and/or of the primer complementary nucleic acid 30 are suitably chosen in order to have a desired melting behaviour.

For example, the primer nucleic acids 16 and/or the connection nucleic acids 14 and/or the primer complementary nucleic acids 30 can be adapted in such a way that a binding of a connection segment 30a and/or of a connection segment 16a to a connection nucleic acid 14 and/or a binding of a primer segment 16b and/or of a primer segment 14b to the nucleic acid 22 and/or an amplicon 22b and/or a target have a similar melting temperature. Preferably, the melting temperatures differ by not more than ±5° C., particularly preferably not more than ±2° C.

According to a preferred embodiment the primer nucleic acids 16 and/or the connection nucleic acids 14 and/or the primer complementary nucleic acids 30 can be adapted in such a way that a length of a connection segment 30a of a primer complementary nucleic acid 30 and/or a length of a connection segment 16a of a primer nucleic acid 16 has an identical length to the connection nucleic acid 14. According to another preferred embodiment the primer nucleic acids 16 and/or the connection nucleic acids 14 and/or the primer complementary nucleic acids 30 can be adapted in such a way that a length of a connection segment 30a of a primer complementary nucleic acid 30 and/or a length of a connection segment 16a of a primer nucleic acid 16 has a different length from the length of the connection nucleic acid 14. The binding length here is substantially determined by the shorter of the two lengths, i.e. by the shorter length of the connection segment 16a or 30a and of the connection nucleic acid 14. This provides the advantage that to vary the binding length only one of the components needs to be replaced, i.e. either the connection nucleic acid 14 or the primer nucleic acid 16 or the primer complementary nucleic acid 30.

Particularly preferably, for example in a kit, local heating elements with connection nucleic acids of different lengths can be provided or offered. By means of a suitable choice of primer nucleic acids 16 and/or primer complementary nucleic acids 30 with connection segments 16a or 30a which are longer than the longest connection nucleic acids 14, the desired melting temperature or a desired melting behaviour can thus be achieved in a series of experiments by trial and error of the different combinations.

In a further preferred embodiment, on the nanoparticles there are not only connection nucleic acids 14 but also further gap-filling nucleic acids, in particular gap-filling oligonucleotides, which do not serve as connection nucleic acids 14, but enable, for example, a saturation of the local heating element surface and/or of the nanoparticle surface and/or a stabilization of the local heating elements 12 or of the nanoparticles 12a and/or a better steric accessibility of the connection nucleic acids 14.

In a further preferred embodiment the connection nucleic acids 14 have a binding nucleotide sequence and additionally a universal spacer sequence (between nanoparticle surface and binding nucleotide sequence or connection segment 14a) which positions the connection nucleic acid 14 or the binding nucleotide sequence at the desired distance from the nanoparticle surface or from the local heating element 12, which can provide steric advantages during the amplification.

The temperature in the reaction solution outside the heated surroundings of the local heating elements can be kept constant during a PCR or laser PCR or else can be varied during the laser PCR.

A detection or a quantification of the target copies of the nucleic acid 22 generated in the amplification reaction can be effected e.g. by (quantitative) real-time PCR and/or PCR and/or gel electrophoresis and/or by means of dye-labelled hybridization probes. Alternatively or additionally, the hybridization between nanoparticles 12a or the bonding of the nanoparticles 12a by hybridization of further nanoparticle-bound oligonucleotides or amplicons can e.g. also be detected e.g. as a red shift and broadening of the plasmon resonance in the extinction spectrum and/or by measurement of a change in the transmittance of the reaction solution 20 at one or more wavelengths, e.g. after optothermal excitation of the nanoparticles 12a and a resultant denaturation of the particle-bonding DNA.

The invention is explained in the following with the aid of various specific examples, but without the invention being limited to these examples. The nucleotide sequences indicated are represented in an overview in the annex.

Example 1

Gold nanoparticles with a diameter of 60 nm (based on BBI Solutions) were used as local heating elements and functionalized with oligonucleotides as connection nucleic acid according to the method by Hurst et al. (see J. Hurst et al., Anal Chem., 78(24), 8313-8318, 2006). The oligonucleotide with sequence 4 was used here. After functionalization and 4 washing steps, the nanoparticles were present with 600 pM in a PBS buffer (10 mM NaCl, 2.11 mM $KH_2PO_4$ (P8709 from Sigma), 2.89 mM $K_2HPO_4$ (P8584 from Sigma), 0.01% Tween 20, 1 mM EDTA-S).

The final laser PCR (sample volume: 40 µl per reaction vessel) contained the following reagents:

| | |
|---|---|
| $MgCl_2$ | 18 mM |
| Tween 20 | 0.1% |
| Apta Taq Genotyping Master (Roche) | 1× |
| Free forward primer (sequence 1, without connection segment) | 700 nM |
| Hydrolysis probe (TaqMan probe) (sequence 2 with FAM-TAMRA) | 200 nM |
| Reverse primer template (sequence 3) | 5 nM or none |
| Gold nanoparticles 60 nm (with connection nucleic acid (sequence 4)) | 60 pM |

Moreover, 400,000 or 40,000 copies of the DNA target (extracted genomic DNA from MRSA) were placed in 40 µl reaction solution. For the negative control, water was used instead of target nucleic acid. Forward primer and reverse primer template as well as the TaqMan probe were chosen such that the resistance gene MecA can be amplified and detected, which occurs for example in the genome of methicillin-resistant *Staphylococcus aureus* (MRSA).

The reaction was effected in two steps:

Firstly, a partial batch was prepared for the hybridization of the connection nucleic acids. The complete quantity of gold particles functionalized with sequence 4 and primer complementary nucleic acids or primer templates (sequence 3) for a complete 40-µl reaction was incubated in a volume of 10 µl in the presence of 15 mM $MgCl_2$ (effective concentration in 10 µl) in a 200-µl PCR tube for 15 min at 37° C. In a parallel batch the primer template or primer complementary nucleic acids (sequence 3) was/were replaced by the corresponding volume of water and incubated analogously.

During the incubation the remaining reagents were mixed together as master mix. $MgCl_2$ was only proportionately supplemented, because a part of it was already contained in the preincubation. In each case 26 µl master mix and 4 µl target nucleic acid concentrated 10 times or water for the negative control were added to and mixed with the 10 µl from the preincubation. The 40 µl were poured into the reaction chambers of the sample plate and the filling openings were sealed with PCR sealing film. The sample chambers have a length of 6 mm, a width of 4 mm and a depth of 1.5 mm. The sample plate was placed in a plate holder and the holder was inserted into the laser cycler. The sample plate was heated for one minute to 69° C. in the laser cycler, before the laser PCR was started. According to this example the samples are scanned in a meandering pattern in each cycle with a laser with a wavelength of 532 nm with an intensity of 5-15 $kW/mm^2$, by moving a focused laser beam relative to the sample volume in two dimensions, with the result that each nanoparticle in the reaction volume is optothermally excited at least once per cycle. (The focal length of the laser focus is sufficient along the third axis of the sample volume (i.e. in its depth) to irradiate all particles with sufficient intensity.) The two-dimensional scanning is achieved by means of a slow and a rapid relative movement between laser focus and sample: the slow movement along the 6-mm longitudinal extent of the reaction chamber is effected by a movement of the sample with a speed of 25 mm per second; simultaneously the laser beam is periodically deflected perpendicular to the movement direction (i.e. covering the 4-mm width of the reaction chamber) with a galvanometer with a line frequency of 1428 Hz and an amplitude of approx. 5 mm, with the result that a movement speed of the focus of approx. 7.1 m/s results here in the transverse direction. With the typical focus size of 15-20 µm, together with the movement speed of the focus, an excitation duration per nanoparticle of approx. 2-3 µs thus results.

As a whole, in each cycle each nanoparticle is optothermally excited at least once, wherein the cycles are repeated 400 times. The duration between two scans per sample was 5 s. The temperature was kept constant at 69° C.

Figure 6:
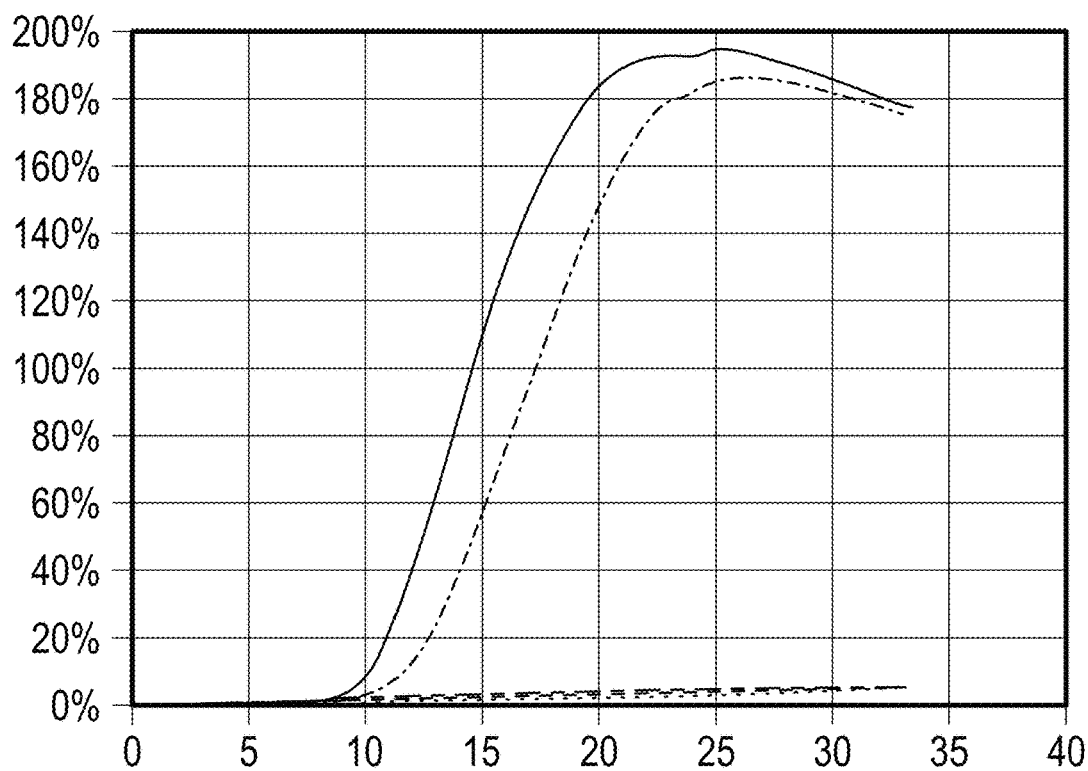
FIG. 6 shows experimental data for the first example.

The result is represented in FIG. 6, in which the change in the fluorescence or the TaqMan signal, i.e. fluorescence released, as dye and quencher of the hydrolysis probe were separated from each other by 5'-3' exonuclease activity of the polymerase and thus by a decomposition of the hydrolysis probe, (vertical axis) is plotted against time in minutes (horizontal axis) in a graph. The continuous line corresponds to the sample with 400,000 copies of the target and with 5 nM sequence 3. The dot-dash line corresponds to the sample with 40,000 copies of the target and with 5 nM primer template (sequence 3). The long-dashed line corresponds to the negative control with only 5 nM sequence 3. The short-dashed line corresponds to 400,00 copies of the target and without sequence 3, and the dotted line corresponds to the negative control without ID3. It can be seen that only the reaction solutions which have both copies of the target and sequence 3 bring about a change in the fluorescence. All other reaction solutions provide substantially no signal which would be clearly distinguished from the zero line.

In the presence of 5 nM primer template (sequence 3) 400,000 and 40,000 copies of the target show a clear fluorescence increase, and thus a positive detection of the target DNA, within easily 10 min. Without primer template no signal increase is obtained even with 400,000 copies of the target in the batch. The batches without gDNA target are likewise negative. Both show that the signal increase in the samples with target and primer template (sequence 3) is not an artefact.

Example 2

The performance of Example 2 substantially corresponded to the performance of Example 1, wherein, deviating therefrom, the primer template (sequence 3) was used with 1 nM to 20 nM or left out. In each case 40,000 copies of genomic DNA of MRSA were used. The result is represented in the graph in FIG. 7, which, analogously to FIG. 6, shows a change in the fluorescence against the duration in minutes. The lower dotted line corresponds to the reaction solution without sequence 3. The dot-dash line corresponds to the reaction solution with 1 nM sequence 3. The upper dotted line corresponds to the reaction solution with 5 nM sequence 3. The continuous line corresponds to the reaction solution with 10 nM sequence 3. The long-dashed line corresponds to the reaction solution with 15 nM sequence 3. The short-dashed line corresponds to the reaction solution with 20 nM sequence 3.

5 nM and 10 nM primer template (sequence 3) deliver the best result. The signal increases early on and steeply. With 1 nM primer template (sequence 3) a later but equally steep signal increase is obtained. The amplification starts with a slight delay here, because the elongation of the connection nucleic acids takes longer, but proceeds equally effectively. With 15 nM and 20 nM primer template the signal increases ever later and ever less steeply. This is because the primer template or the primer complementary nucleic acids competes/compete with the target for the binding to the particle-bound primer and thus can inhibit the amplification.

Example 3

For a rapid effective elongation of the connection nucleic acids, it would in principle be desirable to use the primer template in a high concentration. However, as is to be seen in embodiment example 2, this can lead to an inhibiting of the amplification reaction.

A solution for this can be the destruction or breaking-up of the primer template or primer complementary nucleic acid after elongation of the connection nucleic acids has been effected. This can be achieved by incorporating one or more ribonucleotides distributed over the entire length into the primer template or into the primer complementary nucleic acid. After an upstream step for the elongation of the connection nucleic acids, the primer template can be destroyed enzymatically with an RNase, before the laser PCR is started.

Gold nanoparticles with a diameter of 60 nm (based on BBI Solutions) were functionalized with oligonucleotides according to the method by Hurst et al. (see J. Hurst et al., Anal Chem., 78(24), 8313-8318, 2006). The oligonucleotide with sequence 4 was used here. After functionalization and 4 washing steps, the particles were present with 600 pM in a PBS buffer (10 mM NaCl, 2.11 mM $KH_2PO_4$ (P8709 from Sigma), 2.89 mM $K_2HPO_4$ (P8584 from Sigma), 0.01% Tween 20, 1 mM EDTA-S).

The final laser PCR (sample volume: 40 µl per reaction vessel) contained the following reagents:

| | |
|---|---|
| $MgCl_2$ | 18 mM |
| Tween 20 | 0.1% |
| Apta Taq Genotyping Master (Roche) | 1× |
| Free forward primer (oligo ID1) | 700 nM |
| Hydrolysis probe (sequence 2 with FAM-TAMRA) | 200 nM |
| Ribonucleotide-containing reverse primer template (sequence 3-RN) | 60 nM |
| Gold nanoparticles 60 nm (with connection nucleic acid with sequence 4) | 60 pM |
| RNase H2 (IDT) | 1 mU/µl or none |

In addition, 400,000 or 40,000 copies of the target DNA (genomic DNA of MRSA) in 40 µl sample, wherein water was used instead of target DNA for the negative control. Forward primer and reverse primer template as well as the TaqMan probe were chosen such that the resistance gene MecA, which occurs for example in the genome of methicillin-resistant *Staphylococcus aureus* (MRSA), can be amplified and detected.

The reaction was effected in three steps:

Firstly, a partial batch was prepared for the upstream elongation of the connection nucleic acids.

The complete quantity of gold particles functionalized with sequence 4 and primer template sequence 3-RN (with ribonucleotides) for a 40-µl reaction were incubated in a 200-µl PCR tube for 5 min at 60° C. in a volume of 10 µl in the presence of 15 mM $MgCl_2$ and 1× Apta Taq Genotyping Master from Roche (in each case effective concentration in 10 µl, wherein it is assumed that approx. 3 mM $MgCl_2$ is already contained in the 1× Roche Apta Taq Genotyping Master).

Then 2 µl thermophilic RNase H2 from *Pyrococcus abyssi* (IDT) was added in the concentration of 20 mU/µl—diluted in special diluting buffer from IDT (yields 1 mU/µl in 40 µl final volume). For its activity the RNase H2 additionally needs 0.01% Triton-X-100 (alternatively Tween 20). The RNase H2 diluting buffer from IDT contains 0.1% Triton-X-100, with the result that in the case of suitable dilution of the enzyme sufficient Triton-X-100 enters the reaction in this way. In the laser PCR itself there is 0.1% Tween 20 in any case.

The RNase H2 from *Pyrococcus abyssi* cleaves DNA/RNA heteroduplexes at the 5' end from individually interspersed ribonucleotides. For this, these should lie at a distance of at least 8-10 bases from the 5' end or at least 4 bases from the 3' end.

There was another 5 min of incubation at 60° C., in order to digest the primer template as effectively as possible. The primer template sequence 3-RN contains 5 ribonucleotides uniformly distributed over the sequence, thus is decomposed into up to six pieces.

In a parallel batch, only 2 µl RNase diluting buffer without enzyme was added instead of RNase H2 and incubated analogously.

During the incubation the remaining reagents were mixed together as master mix. MgCl$_2$ and Apta Taq Genomic Master were only proportionately supplemented, because a part of them was already contained in the preincubation. In each case 24 µl master mix and 4 µl target concentrated 10 times were added to and mixed with the 12 µl from the preincubation (including RNase or buffer addition). The 40 µl were poured into the reaction chambers of the sample plate, as in Example 1, and the filling openings were sealed with PCR sealing film. The processing in the laser cycler was effected analogously to Example 1.

Figure 8:
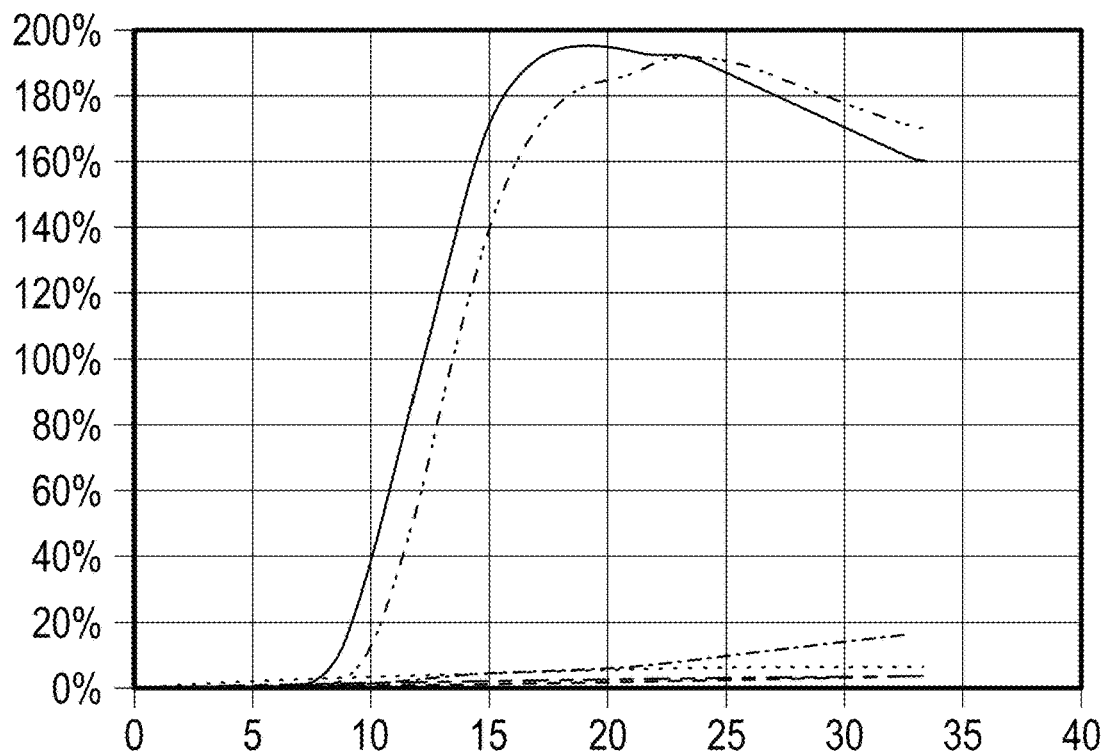
FIG. 8 shows experimental data for the third example.

The result is represented in the graph in FIG. 8, in which a change in the fluorescence is shown against the duration in minutes. The continuous line corresponds to the reaction solution with 400,000 copies of the target DNA with RNase. The long-dashed line corresponds to the reaction solution with 40,000 copies with RNase. The middle-length-dashed line corresponds to the reaction solution with negative control with RNase. The dot-dash line corresponds to the reaction solution with 400,000 copies of the target DNA without RNase. The short-dashed line corresponds to the reaction solution with 40,000 copies of the target DNA without RNase. The dotted line corresponds to the reaction solution with negative control without RNase.

Figure 7:
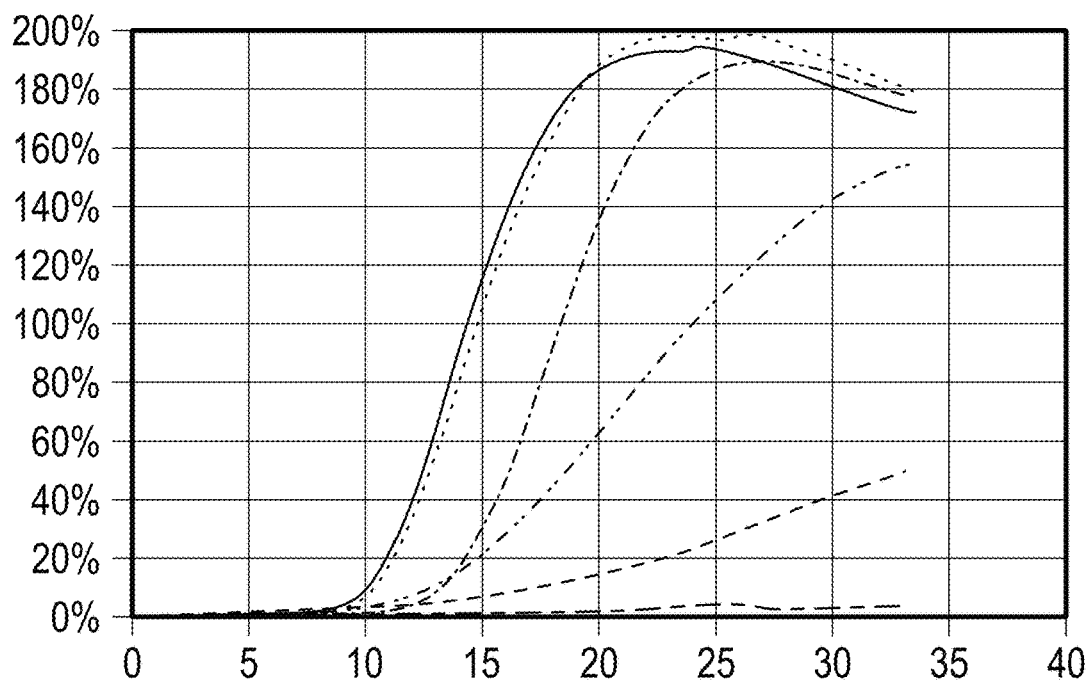
FIG. 7 shows experimental data for the second example.

The primer template sequence 3-RN with ribonucleotides can be used with 60 nM problem-free in the performance of an RNase digestion step. With 400,000 and 40,000 copies of the target the signal increases in each case a few minutes earlier than in the form without RNase digestion in the best result in the preceding example (FIG. 7; 5 nM or 10 nM primer template sequence 3). However, if the RNase digestion is dispensed with, then already 400,000 copies are almost no longer detectable. The signal first increases very late and very shallowly. 40,000 copies are entirely negative. This corresponds to the results in the case of sequence 3 concentrations greater than 10 nM without digestion (FIG. 7).

Large quantities of intact primer template or primer complementary nucleic acids inhibit the amplification, because the primer template competes with the target for the binding to the particle-bound primer.

In the form with RNase digestion the primer template can thus be used in a much higher concentration than in the form without RNase digestion, and a speeding-up of the amplification is thereby achieved.

Example 4

Gold nanoparticles with a diameter of 60 nm (based on BBI Solutions) were functionalized with oligonucleotides according to the method by Hurst et al. (see J. Hurst et al., Anal Chem., 78(24), 8313-8318, 2006). The oligonucleotide with sequence 5 was used here. After functionalization and 4 washing steps, the particles were present with 600 pM in a PBS buffer (10 mM NaCl, 2.11 mM KH$_2$PO$_4$ (P8709 from Sigma), 2.89 mM K$_2$HPO$_4$ (P8584 from Sigma), 0.01% Tween 20, 1 mM EDTA-S).

The final laser PCR (sample volume: 40 µl per reaction vessel) contained the following reagents:

| | |
|---|---|
| MgCl$_2$ | 18 mM |
| Tween 20 | 0.1% |
| Apta Taq Genotyping Master (Roche) | 1× |
| Forward primer nucleic acid (sequence 6) | 30 nM |
| Reverse primer nucleic acid (sequence 7) | 30 nM |
| Hydrolysis probe (sequence 2 with FAM-TAMRA) | 200 nM |
| Gold nanoparticles 60 nm (with connection nucleic acid with sequence 5) | 60 pM |

In addition, 400,000 or 40,000 copies of the target DNA (genomic DNA of MRSA) in 40-µl sample, wherein water was used instead of target DNA for the negative control. Forward- and reverse-primer nucleic acid as well as the TaqMan probe were chosen such that the resistance gene MecA, which occurs for example in the genome of methicillin-resistant *Staphylococcus aureus* (MRSA), is amplified and detected.

In this example the nanoparticle-bound connection nucleic acid with sequence 5 is attached to a 3' thiol on the nanoparticles. Both forward-primer nucleic acid (oligonucleotide with sequence 6) and reverse-primer nucleic acid (oligonucleotide with sequence 7) bear, in each case on the part facing the 5' end, a connection segment and, between connection segment and primer segment, in each case two Spacer 9 modifications as abasic modifications.

Once all components were mixed, they were transferred into the sample plates, as in the previous examples, and these were sealed. Then the sample plate was first heated for 1 minute to 88° C., then warmed in the laser cycler for one minute to 69° C., before the laser PCR was started. The processing in the laser cycler is effected analogously to Example 1, but, deviating from this, with a line frequency of 800 Hz and 250 cycles.

Figure 9:
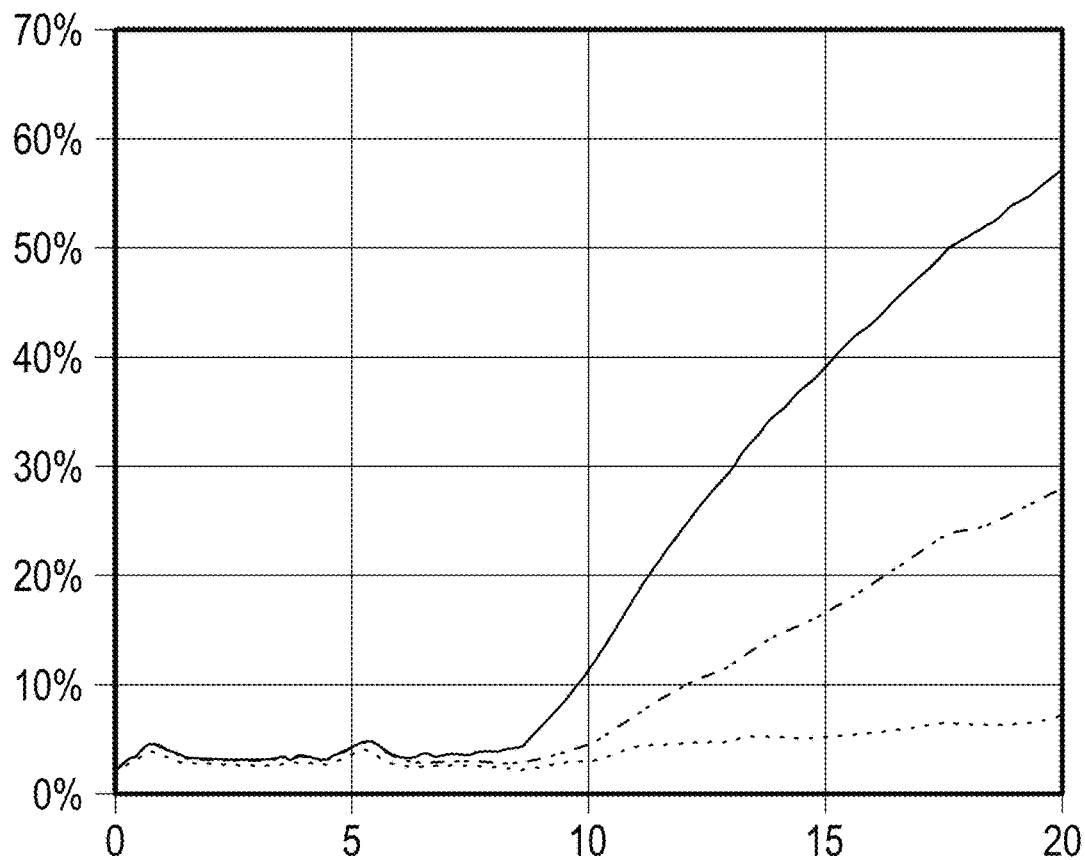
FIG. 9 shows experimental data for the fourth example.

The result is represented in the graph in FIG. 9, which shows a change in the fluorescence against the duration in minutes. The continuous line corresponds to the reaction solution with 400,000 copies of the target DNA. The long-dashed line corresponds to the reaction solution with 40,000 copies. The dotted line corresponds to the reaction solution with negative control without target DNA.

In the presence of 400,000 and 40,000 copies of the target a clear fluorescence increase is shown after approx. 8 minutes or 10 minutes, and thus a positive detection of the target DNA. Without target barely any signal increase is obtained. The nanoparticles have become universally usable local heating elements through functionalization with connection nucleic acids with sequence 5. The connection nucleic acids with sequence 5 directly bound to the nanoparticles are not suitable as primer for the nucleic acid to be detected, simply because the 3' end of oligonucleotides with sequence 5 that can be elongated for the polymerase is not freely accessible, but rather is bound to the nanoparticle surface. Through the use of forward-primer nucleic acid (oligonucleotide with sequence 6) and reverse-primer nucleic acid (oligonucleotide with sequence 7) in each case with connection segment and abasic modifications, the universally usable local heating elements can still be used for the specific amplification and the specific detection of the nucleic acid used.

REFERENCE NUMBERS 10 system
12 local heating element
12a nanoparticle
12b micro heating element
14 connection nucleic acid
16 primer nucleic acid
16a connection segment
16b primer segment
18 reaction vessel
20 reaction solution
22 nucleic acid
22a amplicon
24 (further) primer
26 optical excitation
28 abasic modification
29 surrounding (of a local heating element)
30 complementary connection nucleic acid
30a connection segment
30b primer complementary segment

ANNEX

Sequence List (Order of Sequences in Each Case is from 5' to 3):

Sequence 1:
(SEQ ID No. 1)
AGATGGTATGTGGAAGTTAGATTGG

Sequence 2:
(SEQ ID No. 2)
5'FAM-TCCTGGAATAATGACGCTATGATCCC-TAMRA

FAM = 6-carboxyfluorescein (fluorescent dye),

TAMRA = 6-carboxytetramethylrhodamine (quencher)

Sequence 3:
(SEQ ID No. 3)
GCAGAAAGACCAAAGCATACATAAAAAAAAAAAAAAAAAAAAAAAAAAA
AAAAAAAAAAA Sequence 3-RN:
(SEQ ID No. 4)
GCAGAAAGAcCAAAGCATAcATAAAAAAAAaAAAAAAAAAAaAAAAAAAA
AAaAAAAAAAAA Lower case letters indicate ribonucleotides Sequence 4:
(SEQ ID No. 5)
5'thiol - TTTTTTTTTTTTTTTTTTTTTTTTTTTTTTTTTTTT Sequence 5:
(C6)
(SEQ ID No. 6)
TTTTTTTTTTTTTTTTTTTTTTTTTTTTTTTTTTTT - 3'thiol Sequence 6:
AAAAAAAAAAAAAAAAAAAAAAAAAAAAAAAAAAAA/Sp9//Sp9/
AGATGGTATGTGGAAGTTAGATTGG(SEQ ID No. 7; SEQ ID No. 8)

Sequence 7:
AAAAAAAAAAAAAAAAAAAAAAAAAAAAAAAAAAAA/Sp9//Sp9/
ATGTATGCTTTGGTCTTTCTGC(SEQ ID No. 9; SEQ ID No. 10)

/Sp9/ is an abasic "Spacer 9" modification

The invention claimed is:

1. A system for amplification of a nucleic acid, comprising:
   at least one local heating element functionalized with at least one connection nucleic acid bound to the local heating element within a solution containing the nucleic acid to be amplified, and
   at least one primer nucleic acid configured to:
      simultaneously bind to both the at least one connection nucleic acid and to the nucleic acid to be amplified, the at least one primer nucleic acid comprising (a) a primer segment that is at least partially complementary to a nucleotide sequence of the nucleic acid, and (b) a connection segment that is at least partially complementary to a nucleotide sequence of the connection nucleic acid,
      wherein the connection segment of the at least one primer nucleic acid is to bind to the connection nucleic acid after being placed into the solution separately from the connection nucleic acid, and the primer segment is to bind to the nucleic acid within the solution subsequent to the binding to the connection nucleic acid, and
      wherein the connection nucleic acid is a spacer sequence and the connection segment of the at least one primer nucleic acid is bound to the connection nucleic acid in parallel with the connection nucleic acid.

2. The system of claim 1, wherein each local heating element is a nanoparticle adapted to transfer heat to its surrounding by an excitation.

3. The system of claim 1, wherein each local heating element is a micro heating element adapted to transfer heat to its surrounding by a resistive heating.

4. The system of claim 1, wherein the at least one local heating element is adapted to be in contact with a reaction solution for carrying out a polymerase chain reaction for the amplification of a nucleic acid.

5. The system of claim 1, wherein each primer nucleic acid has at least one abasic modification between the connection segment and the primer segment, and wherein the connection nucleic acid has an abasic modification.

6. The system of claim 1 each primer nucleic acid having a primer segment formed as a forward primer or as a reverse primer.

7. The system of claim 1, wherein at least one of (a) each connection nucleic acid includes an oligonucleotide and (b) each primer nucleic acid includes an oligonucleotide.

8. The system of claim 1, wherein each connection nucleic acid and each primer nucleic acid has at least one immobilizing element adapted to immobilize the primer nucleic acid, if bound to the connection nucleic acid, on the connection nucleic acid in such a way that the primer nucleic acid remains bound to the connection nucleic acid during a denaturation step.

9. The system of claim 8, wherein the at least one immobilizing element is adapted to immobilize the primer nucleic acid on the connection nucleic acid by means of a chemical reaction.

10. A system for amplification of a nucleic acid, comprising:
   at least one local heating element functionalized with at least one connection nucleic acid bound to the local heating element within a solution containing the nucleic acid to be amplified, and
   at least one primer complementary nucleic acid configured to:
      bind to the at least one connection nucleic acid by means of an enzymatic reaction, the at least one primer complementary nucleic acid comprising (a) a primer complementary segment, and (b) a connection segment that is at least partially complementary to a nucleotide sequence of the connection nucleic acid,
      wherein the connection nucleic acid is selected such that the connection nucleic acid is configured to serve at least partially as a primer for amplification of the nucleic acid,
      wherein the connection segment of the at least one primer complementary nucleic acid is to bind to the connection nucleic acid after being placed into the solution separately from the connection nucleic acid, and the primer segment is to bind to the nucleic acid within the solution subsequent to the binding to the connection nucleic acid, and wherein the connection nucleic acid is a spacer sequence and the connection segment of the at least one primer complementary nucleic acid is bound to the connection nucleic acid in parallel with the connection nucleic acid.

11. The system of claim 1, further comprising at least one second primer complementary nucleic acid adapted to bind to the at least one connection nucleic acid and to elongate the connection nucleic acid by a primer nucleotide sequence by means of an enzymatic reaction.

12. The system of claim 1, wherein the at least one primer nucleic acid is to simultaneously bind to both the at least one connection nucleic acid and to the nucleic acid such that multiple points on the connection segment directly bind to the connection nucleic acid while the connection nucleic acid is attached to the at least one local heating element and while the primer segment directly binds to the nucleic acid to be amplified.

13. The system of claim 1, wherein the connection segment of the primer nucleic acid immobilizes to the connection nucleic acid after being placed in the solution such that the connection segment cannot detach from the connection nucleic acid.

14. The system of claim 13, wherein the connection segment of the primer nucleic acid immobilizes to the connection nucleic acid after being placed in the solution through one or more modifications of at least one amino group to the connection segment and to the connection nucleic acid.

* * * * *

SEQUENCE LISTING

<160> NUMBER OF SEQ ID NOS: 10

<210> SEQ ID NO 1
<211> LENGTH: 25
<212> TYPE: DNA
<213> ORGANISM: Artificial Sequence
<220> FEATURE:
<223> OTHER INFORMATION: synthetic functional nucleic acid

<400> SEQUENCE: 1
agatggtatg tggaagttag attgg                25

<210> SEQ ID NO 2
<211> LENGTH: 26
<212> TYPE: DNA
<213> ORGANISM: Artificial Sequence
<220> FEATURE:
<223> OTHER INFORMATION: synthetic functional nucleic acid

<400> SEQUENCE: 2
tcctggaata atgacgctat gatccc               26

<210> SEQ ID NO 3

```
<211> LENGTH: 62
<212> TYPE: DNA
<213> ORGANISM: Artificial Sequence
<220> FEATURE:
<223> OTHER INFORMATION: synthetic functional nucleic acid

<400> SEQUENCE: 3
gcagaaagac caaagcatac ataaaaaaaa aaaaaaaaaa aaaaaaaaaa aaaaaaaaaa      60
aa                                                                    62

<210> SEQ ID NO 4
<211> LENGTH: 62
<212> TYPE: DNA
<213> ORGANISM: Artificial Sequence
<220> FEATURE:
<223> OTHER INFORMATION: synthetic functional nucleic acid

<400> SEQUENCE: 4
gcagaaagac caaagcatac ataaaaaaaa aaaaaaaaaa aaaaaaaaaa aaaaaaaaaa      60
aa                                                                    62

<210> SEQ ID NO 5
<211> LENGTH: 40
<212> TYPE: DNA
<213> ORGANISM: Artificial Sequence
<220> FEATURE:
<223> OTHER INFORMATION: synthetic functional nucleic acid
<220> FEATURE:
<221> NAME/KEY: misc_feature
<222> LOCATION: (1)..(1)
<223> OTHER INFORMATION: 5'-thiol-thymine

<400> SEQUENCE: 5
nttttttttt tttttttttt tttttttttt tttttttttt                           40

<210> SEQ ID NO 6
<211> LENGTH: 40
<212> TYPE: DNA
<213> ORGANISM: Artificial Sequence
<220> FEATURE:
<223> OTHER INFORMATION: synthetic functional nucleic acid
<220> FEATURE:
<221> NAME/KEY: misc_feature
<222> LOCATION: (40)..(40)
<223> OTHER INFORMATION: 3'-thiol-thymine

<400> SEQUENCE: 6
tttttttttt tttttttttt tttttttttt tttttttttn                           40

<210> SEQ ID NO 7
<211> LENGTH: 40
<212> TYPE: DNA
<213> ORGANISM: Artificial Sequence
<220> FEATURE:
<223> OTHER INFORMATION: synthetic functional nucleic acid

<400> SEQUENCE: 7
aaaaaaaaaa aaaaaaaaaa aaaaaaaaaa aaaaaaaaaa                           40

<210> SEQ ID NO 8
<211> LENGTH: 25
<212> TYPE: DNA
<213> ORGANISM: Artificial Sequence
<220> FEATURE:
<223> OTHER INFORMATION: synthetical functional nucleic acid

<400> SEQUENCE: 8
```

```
agatggtatg tggaagttag attgg                                         25

<210> SEQ ID NO 9
<211> LENGTH: 40
<212> TYPE: DNA
<213> ORGANISM: Artificial Sequence
<220> FEATURE:
<223> OTHER INFORMATION: synthetic functional nucleic acid

<400> SEQUENCE: 9
aaaaaaaaaa aaaaaaaaaa aaaaaaaaaa aaaaaaaaaa                         40

<210> SEQ ID NO 10
<211> LENGTH: 22
<212> TYPE: DNA
<213> ORGANISM: Artificial Sequence
<220> FEATURE:
<223> OTHER INFORMATION: synthetic functional nucleic acid

<400> SEQUENCE: 10
atgtatgctt tggtctttct gc                                            22
```